(12) United States Patent
Jagota et al.

(10) Patent No.: US 11,755,914 B2
(45) Date of Patent: Sep. 12, 2023

(54) MACHINE LEARNING FROM DATA STEWARD FEEDBACK FOR MERGING RECORDS

(71) Applicant: salesforce.com, inc., San Francisco, CA (US)

(72) Inventors: Arun Kumar Jagota, Sunnyvale, CA (US); Piranavan Selvanandan, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 741 days.

(21) Appl. No.: 16/361,026

(22) Filed: Mar. 21, 2019

(65) Prior Publication Data
US 2020/0250576 A1    Aug. 6, 2020

Related U.S. Application Data

(63) Continuation-in-part of application No. 16/263,313, filed on Jan. 31, 2019, now Pat. No. 11,010,771.

(51) Int. Cl.
*G06N 20/00* (2019.01)
*G06N 3/084* (2023.01)
*G06F 16/901* (2019.01)
*G06N 7/01* (2023.01)

(52) U.S. Cl.
CPC ......... *G06N 3/084* (2013.01); *G06F 16/9024* (2019.01); *G06N 7/01* (2023.01); *G06N 20/00* (2019.01)

(58) Field of Classification Search
CPC combination set(s) only.
See application file for complete search history.

(56) References Cited

U.S. PATENT DOCUMENTS

| 5,577,188 A | 11/1996 | Zhu |
| 5,608,872 A | 3/1997 | Schwartz |
| 5,649,104 A | 7/1997 | Carleton |

(Continued)

OTHER PUBLICATIONS

International Search Report and Written Opinion from International Patent Application No. PCT/US2020/024008, dated Jun. 12, 2020.

(Continued)

*Primary Examiner* — Arif Ullah
(74) *Attorney, Agent, or Firm* — Dergosits & Noah LLP; Todd A. Noah

(57) ABSTRACT

System determines first and second scores based on applying function to features of first and second values in fields in first and second records, respectively. System determines first priority based on first score and second priority based on second score for displaying first and second values in fields in first profile. System revises, based on feedback associated with first value and second value, parameter associated with function and determines third score based on applying function, associated with revised parameter, to feature of third value in field in third record. System determines fourth score based on applying function, associated with revised parameter, to feature of fourth value in field in fourth record and determines third priority, based on third score, for displaying third value in field in second profile and fourth priority, based on fourth score, for displaying fourth value in field in second profile.

20 Claims, 5 Drawing Sheets

(56) References Cited

U.S. PATENT DOCUMENTS

| | | |
|---|---|---|
| 5,715,450 A | 2/1998 | Ambrose et al. |
| 5,761,419 A | 6/1998 | Schwartz |
| 5,819,038 A | 10/1998 | Carleton |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier |
| 6,654,032 B1 | 11/2003 | Zhu |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,340,411 B2 | 3/2008 | Cook |
| 7,356,482 B2 | 4/2008 | Frankland et al. |
| 7,401,094 B1 | 7/2008 | Kesler |
| 7,620,655 B2 | 11/2009 | Larsson |
| 7,698,160 B2 | 4/2010 | Beaven et al. |
| 7,730,478 B2 | 6/2010 | Weissman |
| 7,779,039 B2 | 8/2010 | Weissman et al. |
| 7,779,475 B2 | 8/2010 | Jakobson et al. |
| 7,851,004 B2 | 12/2010 | Hirao et al. |
| 8,010,663 B2 | 8/2011 | Firminger et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven et al. |
| 8,095,594 B2 | 1/2012 | Beaven et al. |
| 8,209,308 B2 | 6/2012 | Jakobson et al. |
| 8,275,836 B2 | 9/2012 | Beaven et al. |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,664 B2 | 8/2013 | Rueben et al. |
| 8,566,301 B2 | 10/2013 | Rueben et al. |
| 8,635,212 B1* | 1/2014 | Bunn ................. G06F 16/9535 707/723 |
| 8,646,103 B2 | 2/2014 | Jakobson et al. |
| 8,930,413 B2 | 1/2015 | Tang et al. |
| 8,972,336 B2 | 3/2015 | Jagota |
| 9,256,656 B2* | 2/2016 | Fankhauser ........... G06F 16/254 |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2004/0001092 A1 | 1/2004 | Rothwein et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2011/0067009 A1* | 3/2011 | Hosokawa ............... G06F 8/20 717/132 |
| 2011/0178962 A1 | 7/2011 | Sood |
| 2012/0023107 A1 | 1/2012 | Nachnani et al. |
| 2012/0059853 A1* | 3/2012 | Jagota .................... G06F 16/29 707/E17.014 |
| 2012/0233137 A1 | 9/2012 | Jakobson et al. |
| 2013/0218948 A1 | 8/2013 | Jakobson |
| 2013/0218949 A1 | 8/2013 | Jakobson |
| 2013/0218966 A1 | 8/2013 | Jakobson |
| 2014/0279739 A1 | 9/2014 | Elkington et al. |
| 2014/0359537 A1 | 12/2014 | Jakobson et al. |
| 2015/0007050 A1 | 1/2015 | Jakobson et al. |
| 2015/0032738 A1 | 1/2015 | Nachnani et al. |
| 2015/0095162 A1 | 4/2015 | Jakobson et al. |
| 2015/0172563 A1 | 6/2015 | Jakobson et al. |
| 2016/0357790 A1 | 12/2016 | Elkington et al. |

(56) References Cited

U.S. PATENT DOCUMENTS

2017/0024391 A1* 1/2017 Steck .................... G06F 16/337
2017/0053064 A1* 2/2017 Bhavani .............. G06F 16/5866

OTHER PUBLICATIONS

Lin et al., "Efficient entity resolution on heterogeneous records," IEEE Transactions on Knowledge and Data Engineering, Feb. 7, 2019, retrieved Oct. 28, 2022, from https://arxiv.org/pdf/1610.09500.pdf.

Ehrig et al., "Measuring Similarity between Semantic Business Process Models," Institute of Applied Informatics and Formal Description Methods, Karlsruhe Institute of Technology, 2007.

* cited by examiner

MACHINE LEARNING FROM DATA STEWARD FEEDBACK FOR MERGING RECORDS

CLAIM OF PRIORITY AND RELATED APPLICATION DATA

This application is a continuation-in-part of U.S. application Ser. No. 16/263,313 filed Jan. 31, 2019, which is incorporated herein by reference in their entirety and for all purposes.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Companies are often overwhelmed with customer data. Examples of customer data fields include a name, a billing address, a shipping address, an email address, and a phone number. Managing customer data may become extremely complex and dynamic due to the many changes that individual customers go through over time. For example, a company's purchasing agent can change her family name upon marriage, change her email address, change her phone number, and change her employer within a relatively short period of time. In another example, a customer who is known by the name Robert can also use Rob, Robby, Bob, and Bobby as his given name. The use of customer data may create additional challenges, such as due to invalid email addresses, invalid phone numbers, invalid street addresses, names spelled wrong, incorrect employer information, and duplicate customer data records with inconsistent information. When these customer data fields are multiplied by the millions of customer data records which a company may have in its data sources, and the frequency of how often this customer data is incorrect or changes is also taken into consideration, the result is that many companies have a significant data management challenge.

Furthermore, the potential for customer data challenges may increase when customer data enters a company's customer data system from the company's multiple data sources. Examples of a company's data sources include the customer data from interactions conducted by the company's marketing, retail, and customer service departments. This customer data may be distributed for storage by different cloud storage providers, and/or these company departments may be organized as different tenants in a multi-tenant database.

A traditional approach to resolving these challenges is through the instantiation of a database system that functions as a master data management hub which stages, profiles, cleanses, enriches, matches, reconciles, and instantiates all customer related records to create a single master profile for each customer, and then provides access to these master profiles and their cross references to business applications. The database system can use the generated master profiles to assist in responding to customer requests. For example, a customer makes a purchase via a company's retail cloud instance, and the customer enters some identifying information when filing a service request with the company's customer service cloud instance. The database system responds by automatically finding all that is known about this customer in their master profile, especially in the purchase record(s) of the relevant item, so as to enable the company's customer service department to process the service request more effectively.

Since customer data processing is complex, errors may occur. For example, during a matching process a database system may miss a match between a record that stores the name Jonathan Smith and another record that stores the misspelled name Jontahon Smith. In another example, during a matching process a database system may erroneously identify a match between a record that stores the name Erica Jones and another record that stores the lexically similar name Eric Jones. In yet another example, during a clustering process a database system may group records of different people, such as John Smith and Jonathan Smith, into a set of records for one person.

The master profile construction process involves matching person records, followed by clustering sets of matched records as being records for the same person, and finally by merging a clustered set of records into one record that functions as a master profile. For example, a clustered set of matched records contains 5 records for the same person, and these 5 records store 3 distinct first name field values, R., Robert, and Bob. The merging process determines which of these three values, or possibly some other value, should be listed as the first name in the master profile. More generally, some fields in a master profile may be permitted to store multiple values. such as multiple values for a person's email address and multiple values for a person's phone number. While all of the merged records' values may be listed by the master profile, the database system may assign a different importance score to each of a field's multiple values. For example, in a business to business setting, business email addresses may have a higher priority than personal email addresses, while in a business to customer setting the personal email addresses may have a higher priority than the business email addresses. In addition to each organization's specific issues influencing the orderings of the various values, locale-specific intricacies arise as well.

Such matching, clustering, and merging problems are exacerbated when a database system processes international data. For these reasons, data stewards often closely monitor the accuracy of the matching, clustering, and merging processes, and override these decisions when appropriate. A data steward can be a role within an organization, which is responsible for ensuring the fitness of the organization's information elements.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

General Overview

Figure 1:
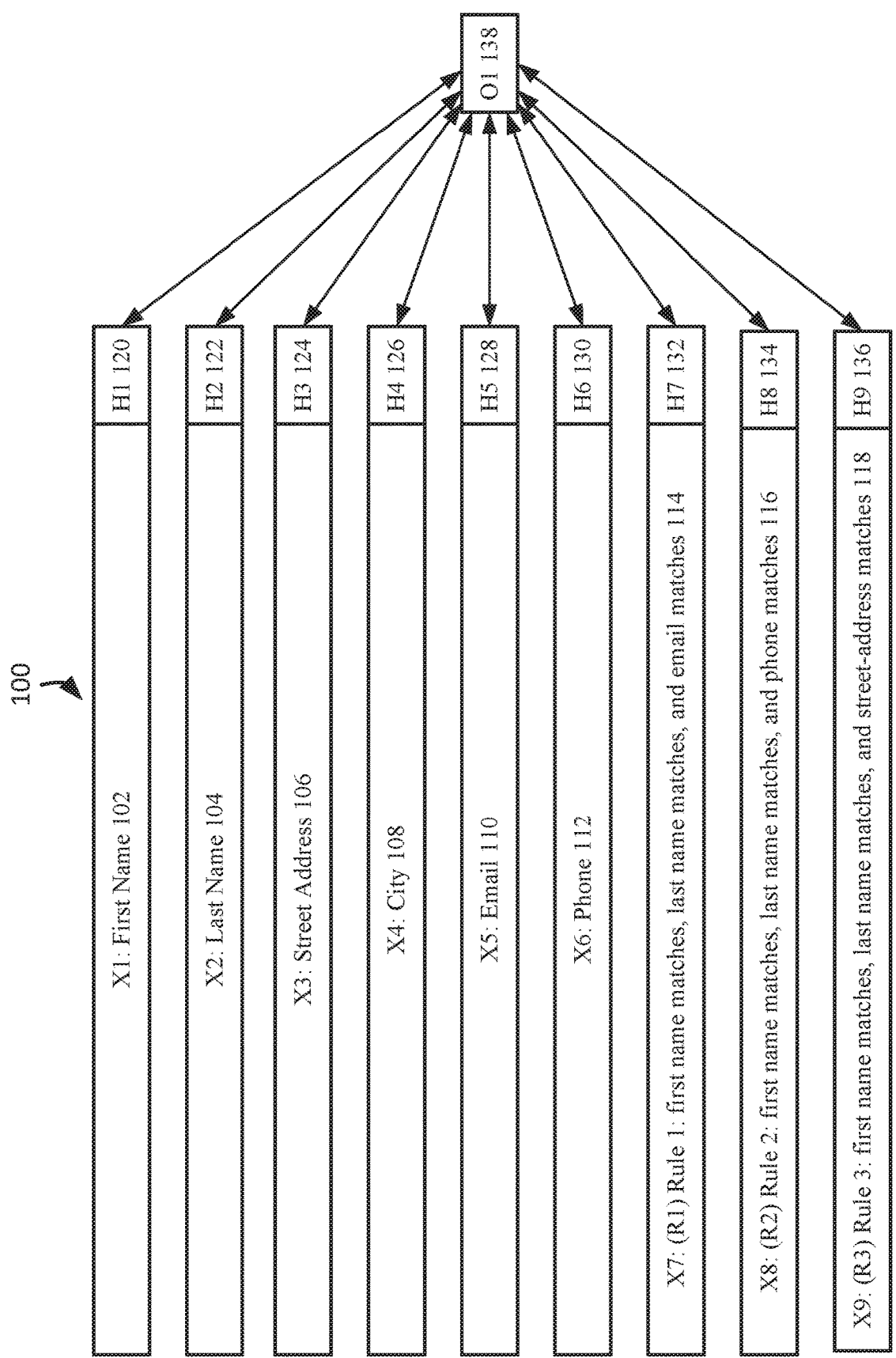
FIG. 1 illustrates example data structures used for machine learning from data steward feedback for merging records, in an embodiment.

In accordance with embodiments described herein, there are provided methods and systems for machine learning from data steward feedback for merging records. A system determines a first score based on applying a function to a feature of a first value in a field in a first record. The system determines a second score based on applying the function to the feature of a second value in the field in a second record. The system determines a first priority, based on the first score, for displaying the first value in the field in a first profile, and a second priority, based on the second score, for displaying the second value in the field in the first profile. The system revises, based on feedback associated with the first value and the second value, at least one parameter associated with the function. The system determines a third score based on applying the function, associated with the revised at least one parameter, to the feature of a third value in the field in a third record. The system determines a fourth score based on applying the function, associated with the revised at least one parameter, to the feature of a fourth value in the field in a fourth record. The system determines a third priority, based on the third score, for displaying the third value in the field in a second profile, and a fourth priority, based on the fourth score, for displaying the fourth value in the field in the second profile.

For example, a customer resolution engine accesses a retail record that stores Liz Smith, 1 Market Street, San Francisco, 94105, California, USA, and applies a first name length function to the first name field's value Liz by identifying the frequency of 3 character-long first names in a sample first name data set as 0.060, and by calculating the logarithm of 0.060 as the first name length score of negative 1.22 for Liz. Similarly, the customer resolution engine accesses a customer service record that stores Elizabeth Smith, 1 Market Street, San Francisco, 94105, CA, USA, and applies the first name length function to the first name field's value Elizabeth by identifying the frequency of 9 character-long first names in the sample first name data set as 0.029, and by calculating the logarithm of 0.029 as the first name length score of negative 1.54 for Elizabeth. The customer resolution engine assigns a high priority for displaying Liz at the top of the first name field in Smith's master profile and a low priority for displaying Elizabeth at the bottom of the first name field in Smith's master profile because the first name length score of negative 1.22 for Liz is higher than the first name length score of negative 1.54 for Elizabeth.

The data steward reviews the customer service representative's note specifying that Smith prefers to be called Elizabeth rather than Liz, and then modifies the order of the first names in Smith's master profile. The machine learning framework receives the data steward's first name preference for Elizabeth over Liz, which was automatically generated by the data steward's modification. Then the machine learning framework adds pseudo counts to the 9 character-long first names in the sample first name data set to raise the corresponding frequency of 0.029 by 7% to 0.031 to reflect the data steward's preference for a 9 character-long first name. Similarly, the machine learning framework adds negative pseudo counts to the 3 character-long first names in the sample first name data set to lower the corresponding frequency of 0.060 by 7% to 0.056 to reflect the data steward's lack of preference for a 3 character-long first name.

Then the customer resolution engine accesses a retail record that stores Al Jones, 1 Wall Street, New York City, N.Y., 10005, United States, and applies the first name length function to the first name field's value Al by identifying the frequency of 2 character-long first names in the sample first name data set as 0.030, and by calculating the logarithm of 0.030 as the first name length score of negative 1.52 for Al. Similarly, the customer resolution engine accesses a customer service record that stores Alexander Jones, 1 Wall St., NYC, N.Y., 10005, USA, and applies a first name length function to the first name field's value Alexander by identifying the revised frequency of 9 character-long first names in the sample first name data set as 0.031, and by calculating the logarithm of 0.031 as the first name length score of negative 1.51 for Alexander. The customer resolution engine assigns a high priority for displaying Alexander at the top of the first name field in Jones' master profile and a low priority for displaying Al at the bottom of the first name field in Jones' master profile because the first name length score of negative 1.51 for Alexander is higher than the first name length score of negative 1.52 for Al. By learning the data steward's preference for 9 character-length first names and slightly modifying the first name frequencies used by the first name length function, the machine learning framework enables the customer resolution engine to assign a priority for displaying Alexander instead of Al at the top of the first name field in Jones' master profile.

Systems and methods are provided for machine learning from data steward feedback for merging records. As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system. The following detailed description will first describe a data structure for machine learning from data steward feedback for merging records. Next, network models, methods, and systems for machine learning from data steward feedback for merging records will be described with reference to example embodiments.

While one or more implementations and techniques are described with reference to an embodiment in which machine learning from data steward feedback for merging records is implemented in a system having an application server providing a front end for an on-demand database service capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the embodiments described herein may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

To effectively leverage feedback from data stewards, the feedback needs to be expressed suitably. For example, if a data steward determines that a customer resolution engine has clustered records for Erica Jones and Eric Jones in the same master profile, the data steward identifies the mismatched field first_name, identifies the mismatched fields' values Erica and Erica, and labels the record match as a false match. The data steward provides an insight in going from the false match of two records to attributing this false match to a false match of two values in particular fields of the two records. This sort of attribution of false matches of records to particular fields in the records is generally difficult for a machine learning framework to determine on its own.

If a data steward cannot determine with certainty which field match led to a false match, the data steward can assign a probability to each of the records' fields based on the likelihood that a field is responsible for the false match. These probabilities, even if crude in any one instance, when accumulated over many instances can start guiding machine learning effectively. If a customer resolution engine misses a match between a record that stores the name Jonathan Smith and another record that stores the misspelled name Jonathon Smith, a data steward can collect common misspellings of the name Jonathan, such as Jonathon, Joanathan, and Jonothan, and then provide these misspellings to the machine learning framework in the form of positive instances of matches to the name Jonathan.

A data steward may determine that a customer resolution engine matched two records and conclude, possibly assisted by additional information, that there is insufficient evidence for these two records to match. For example, the two records store:

| first_name | last_name | address | city |
|---|---|---|---|
| john | smith | 1 Market St, | San Francisco |
| John | Smith | 100 Main St. | South San Francisco. |

The data steward can create a training set instance: ((fn=john, ln=smith, address=1 Market St, city=San Francisco), (fn=John, ln=Smith, address=100 Main St, city=South San Francisco), 0 [false match]).

The data steward might optionally attach probabilities (or weights) on the various fields for their likelihood of having contributed to the false match. Continuing the example, the data steward assigns the following weights:
(fn-weight=0, ln-weight=0, address-weight=0.75, city-weight=0.25).

The machine learning framework can create additional field-level instances to leverage this additional information, such as:
field_name: address training instance: (1 Market St, 100 Main St, 0) training instance weight: 0.75;
field_name: city training instance: (San Francisco, South San Francisco, 0) training instance weight: 0.25.

A customer can reveal to a data steward that a certain expected record match is not occurring as expected by the customer. For example, the following two records should have matched:

| first_name | last_name | address | city |
|---|---|---|---|
| john | smith | 1 Market St, | S San Francisco |
| Johnny | Smith | 2 Market St, | South San Francisco. |

The data steward can create a record-level positive training instance ((fn=john, ln=smith, address=1 Market St, city=S San Francisco), (fn=Johnny, ln=Smith, address=2 Market St, city=South San Francisco), 1 [missed match])

The data steward can optionally attach probabilities (or weights) on the various fields for their likelihood of having contributed to the missed match. Continuing the example, the data steward assigns the following weights:
(fn-weight=0.33, ln-weight=0, address-weight=0.33, city-weight=0.33).

From these weights, the machine learning framework can create additional field-level instances to leverage this additional information, such as:
field_name: first_name training instance: (john, Johnny,1) training instance weight: 0.33,
field_name: address training instance: (1 Market St, 2 Market St, 1) training instance weight: 0.33,
field_name: city training instance: (S San Francisco, South San Francisco,1) training instance weight: 0.33.

A data steward may determine that a customer resolution engine created two separate clusters of records that are the basis for two separate master profiles, and that these clusters of records should be combined into one cluster of records that is the basis for one master profile. For example:

| first_name | last_name | address | city |
|---|---|---|---|
| Profile 1 | | | |
| John | Smith | 1 Market | San Francisco |
| Johnny | Smith | 1 Market St | San Francisco |
| Profile 2 | | | |
| John | Smith | 1 Mrket St | San Francisco |
| Johnny | Smith | 1 Mrkt St | San Francisco |

Upon this discovery, the data steward can recommend merging these two clusters of records for two master profiles into one cluster of records for one master profile. The machine learning framework can respond by creating four training set instances—one for each combination of one record from Profile 1 and one record from Profile 2. A positive instance specifies two records and asserts that they should match.

| | | | |
|---|---|---|---|
| (John | Smith | 1 Market | San Francisco, |
| John | Smith | 1 Mrket St | San Francisco, 1 [positive match]) |
| (Johnny | Smith | 1 Market St | San Francisco, |
| John | Smith | 1 Mrket St | San Francisco, 1 [positive match]) |
| (John | Smith | 1 Market | San Francisco, |
| Johnny | Smith | 1 Mrkt St | San Francisco, 1 [positive match]) |
| (Johnny | Smith | 1 Market St | San Francisco, |
| Johnny | Smith | 1 Mrkt St | San Francisco, 1 [positive match]) |

In addition, the data steward may optionally assign probabilities to the likely fields that contributed to the missed matches. Continuing this example, the data steward assigns the following weights:

| first_name | last_name | address | city |
|---|---|---|---|
| 0 | 0 | 1.0 | 0 |

From these weights, the machine learning framework can create new field-level positive instances, such as field: address training instances:
(1 Market, 1 Mrket St, 1), (1 Market St, 1 Mrket St, 1), (1 Market,1 Mrkt St, 1), (1 Market St, 1 Mrkt St, 1)

A data steward may determine that a customer resolution engine created a cluster of records which is the basis for a master profile, and then specify that this cluster of records should be split into two separate clusters of records that are the basis for two separate master profiles. For example:

| Profile | | | |
|---|---|---|---|
| first_name | last_name | address | city |
| John | Smith | 1 Market | San Francisco |
| J | Smith | Market | New York City |
| John | Smith | 1 Market St | San Francisco |

The data steward can remove the second record from this master profile, and then create a new master profile for the removed record. The machine learning framework can respond by creating two negative record-level instances for training:

| | | | |
|---|---|---|---|
| (John | Smith | 1 Market | San Francisco, |
| J | Smith | Market | New York City, 0) |
| (J | Smith | Market | New York City, |
| John | Smith | 1 Market St | San Francisco, 0) |

This training reinforces that in the two mismatching instances the cities are San Francisco and New York City. This takes advantage of the two matching records in the profile both storing the city San Francisco, whereas the one record that was removed from this profile stores the city New York City. Repeated feedback of this type, when aggregated over multiple training instances will enable the machine learning framework to learn that records in such vastly different cities are unlikely to be in the same cluster of records. On the other hand, while in these negative instances J and John also get negatively reinforced as first name matches, there will be other positive feedback in which J and John match. Consequently, the customer resolution engine will not be as definitive in using the mismatch of the first names (J, John) as a predictor of a record-level mismatch.

In addition, the data steward may optionally assign probabilities to the likely fields that contributed to the false matches. In this example, the data steward can assign the following weights:

| first_name | last_name | address | city |
|---|---|---|---|
| 0 | 0 | 0 | 1.0 |

From these, the machine learning framework can create new field-level negative instances, such as field: city training instances (San Francisco, New York. 0), (New York, San Francisco, 0).

The data steward can provide more granular insights into the split to the machine learning framework. For example, the data steward splits the cluster of records {a, b, c, d, e} for a master profile into the cluster of records {a, b, c} and the cluster of records {d, e}. The machine learning framework can respond by displaying the match graph for the cluster of records {a, b, c, d, e} to the data steward. The match graph can reveal which pairs of records in the cluster of {a, b, c, d, e} were determined to match by the customer resolution engine. The data steward reviews the match graph and identifies the match a-e as the one and only false match responsible for having combined the cluster of records {a, b, c} and the cluster of records {d, e} in the same cluster of records {a, b, c, d, e}. The machine learning framework can respond by creating just one negative instance a-e. Furthermore, the data steward can review the records a and e of the negative instance a-e, identify that the record a stores the name Erica Jones and that the record e stores the name Eric Jones, and identify the mismatched field first_name. The machine learning framework can respond by creating a negative instance on the first name field for (Erica, Eric). A single record incorrectly placed in a cluster of records is a special case of this scenario.

The match of two records does not require a match on all fields in the two records. The records may match in their first name, last name, and street address, but mismatch in their email address, because one email may be a personal email while the other email may be a business email. Therefore, sufficient evidence may exist for a record-level match despite the email mismatch. In contrast, a field-combination level match, which may be referred to as a match rule, requires a match on all fields in a combination of fields. An example of a match rule is first name matches and last name matches and phone matches. The notion of field-level combinations is also useful for composite fields such as address= (street, city, zip, state, country). The reason for distinguishing between record-level matches and field-combination level matches is that the machine learning framework can take advantage of the additional requirement that field-combination level matches imposes. Indeed, if a database system stores domain knowledge that enables deriving a rule-based matching system, this domain knowledge may be provided to machine learning framework by creating a corresponding field-level combination. This allows a machine learning framework to leverage this additional knowledge to improve its accuracy. From the knowledge of which fields compose a certain field-level combination, the machine learning framework can automatically extract features that are composed from features on the individual fields, thereby capturing interactions which increase its accuracy.

As a simple example, John matching John, or Smith matching Smith, or San Francisco matching San Francisco are by themselves weak evidence for a record level match for a person. However, if all three of these three fields match, then the evidence becomes stronger that their records match, and the evidence becomes even stronger if the phone number matches as well. Therefore, the machine learning framework effectively can create a new composite field for each field-level combination. For example, a person record has 6 fields: first name, last name, street-address, city, email, phone. FIG. 1 depicts machine learning framework 100 having 6 input neurons, one input neuron for each of the 6 fields. Input neuron $x_1$ corresponds to the first name field 102, input neuron $x_2$ corresponds to the last name field 104, input neuron $x_3$ corresponds to the street address field 106, input neuron $x_4$ corresponds to the city field 108, input neuron $x_5$ corresponds to the email field 110, and input neuron $x_6$ corresponds to the phone field 112. The machine learning framework 100 adds three field-level combinations, or three match rules: (R1) Rule 1: first name matches and last name matches and email matches, (R2) Rule 2: first name matches and last name matches and phone matches, and (R3) Rule 3: first name matches and last name matches and street-address matches.

The machine learning framework adds three more input neurons, denoting R1, R2, and R3 respectively, such that the machine learning framework now has 9 inputs: $x_1, x_2, x_3, x_4, x_5, x_6, x_7, x_8, x_9$, where $x_7, x_8, x_9$ correspond to R1, R2, R3. Input neuron $x_7$ corresponds to (R1) Rule 1: first name matches, last name matches, and email matches 114, input neuron $x_8$ corresponds to (R2) Rule 2: first name matches, last name matches, and phone matches 116, and input neuron $x_9$ corresponds to (R3) Rule 3: first name matches, last name matches, and street-address matches 118. As one instantiation, $x_i = x_{i1} * x_{i2} * \ldots x_{ik}$, where $i_1, i_2, \ldots i_k$ denote the atomic fields of which the composite field i is composed.

Specific matching and clustering feedback units may be abstracted out from the various feedback scenarios described above: feedback units on a pair of records, feedback units on a pair of tuples of values over specific fields, and feedback units on a pair of values of a specific field. A pair of tuples is treated separately from matching a pair of records because a match of a pair of tuples implies that each field in the pair of tuples should match, but such an assumption is not reasonable when matching a pair of records. A data steward labels each type of feedback as either positive (+1) or negative (0 or −1 depending upon system configuration) to capture whether the corresponding values should match or should not match. The data steward assigns a label at the record level for matching a pair or records or a pair of tuples, and at the field level for matching a pair of values. A data steward can also assign a weight as part of a feedback. The weight captures the strength of the data steward's belief that that an instance should have the attached label, such that definite matches or mismatches would have higher weights than ambiguous matches or mismatches. Therefore, matching feedback is at two levels, at the level of scalar values (a pair of field values), and at the level of tuples of values (a pair of record values).

The machine learning framework comprises of field-level matchers, which may be machine-learnt, whose scores are transformed by sigmoid functions. The transformed scores are then fed into an overall record-level score function, which is transformed by another sigmoid function. Examples of fields are first name, last name, phone number, street address, city, postal code, . . . . The system architecture is depicted in FIG. 1, in which all neurons can have a sigmoidal transform function. More formally, given two records U and V, $$S(U,V) = \sigma(\Sigma_i w_i \sigma_i(s_i(u_i, v_i))) \quad \text{Equation 1}$$

Here $S(U, V)$ denotes the overall score of the match of the two records, $s_i(u_i, v_i)$ denotes the score of the match of the values $u_i$ and $v_i$ in field i of these records, $\sigma_i$ denotes the sigmoid function that approximates a step function on $s_i(u_i, v_i)$, and $w_i$ denotes the weight with which $s_i(u_i, v_i)$ contributes to the overall score $S(U, V)$. The i's in $s_i$ and $\sigma_i$ are there as reminders that the field-level score function and sigmoid depend on the field i. That is, different fields can have different scoring functions and different sigmoid functions. $\sigma$ denotes the sigmoid function at the record-level scoring. This function squashes its input into the range 0 to 1, (or the range −1 to 1, depending on system configuration) resulting in an overall match score that is normalized. The sigmoid functions' gains and offset parameters are suppressed in Equation 1 to simplify notation.

While all individual field-level matchers that compute $s_i(u_i, v_i)$ for the various fields i employ machine learning, each of these matchers learn differently. First, different fields will have different training sets, such as pairs of instances (first names, phone numbers, etc) that should match or should not match. Second, different fields have different types of matching scenarios. These differing scenarios are isolated into field-specific feature engineering that the various machine learning matchers employ.

For record-level training, the learnable parameters are the weights $w_1, w_2, \ldots w_n$ that control the influence of field-level matches to the record-level match score, and the gains and the offsets of the n+1 sigmoid functions that control the location and the steepness of the (soft) decision thresholds. Simplifying the notation of Equation 1 into the more familiar neural network notation, $x_i$ denotes the match score on field i for the given pair of records.

$$S(U,V) = \sigma(\Sigma_i w_i \sigma_i(x_i)) \quad \text{Equation 2}$$

Next, Equation 2 is transformed a little more—into a neural network with hidden layer neurons and sigmoidal neurons. The sigmoid functions themselves will have no learnable parameters. This transformation will enable the use of the well-known backpropagation algorithm for training. The stochastic gradient descent is especially well suited to enable learning incrementally from the feedback of the data stewards. Therefore, Equation 2 may be re-expressed as:

$$S(U,V) = \sigma(w_0 h_0 + \Sigma_i w_i h_i), h_i = \sigma(b_i x_0 + \Theta_i x_i) \quad \text{Equation 3}$$

In Equation 3, the learnable parameters are $w_0, w_1, \ldots w_n$ and $b_i, \Theta_i, i=1, \ldots n$. The x's are at the input layer, the h's at the hidden layer, and there is a single neuron at the output layer. FIG. 1 depicts the hidden layer neurons $h_1$ 120, $h_2$ 122, $h_3$ 124, $h_4$ 126, $h_5$ 128, $h_6$ 130, $h_7$ 132, $h_8$ 134, and $h_9$ 136, which correspond to the input neurons $x_1$ 102, $x_2$ 104, $x_3$ 106, $x_4$ 108, $x_5$ 110, $x_6$ 112, $x_7$ 114, $x_8$ 116, and $x_9$ 118, and which are connected to the output neuron 1 138. All neurons can have fixed sigmoidal activation functions. In this setting $x_0$ and $h_0$ are both always kept frozen to −1. In going from Equation 1 to Equation 3, the leanings of the sigmoidal gains are absorbed into the learnings of the weights $[\sigma_\mu(W X) = \sigma(\mu W X)]$ and the learnings of the sigmoidal offsets create extra dimensions whose values are frozen to −1.

In Equation 3, the influence that a match on field i has on a record-level match may be estimated by rippling the value $x_i$ up the network. First, $x_i$ is multiplied by $\Theta_i$. So as an extreme example, if $\Theta_i$ were zero, the value of $x_i$ would have no influence. Second, $h_i$, the normalized version of $x_i$ is multiplied by $w_i$. Therefore, $w_i$ controls the relative influence of $h_i$ on the overall match score.

This scheme lends itself to multi-level training. In particular, to train on labeled instances at the level of (possibly composite) field i, the system only trains $h_i$ from $x_i$. The instances are of the form $(x_i, h_i)$ where $h_i$ is −1 or 0 denoting a field-level mismatch or 1 denoting a field-level match. Record-level training on the other hand mostly affects the weights $w_i$ from the hidden layer neurons $h_i$ to the output neuron. Via back-propagation this feedback may be rippled down to adjust $b_i$ and $\Theta_i$, as well. Here also effectively the parameters from the input neuron $x_i$ to the hidden layer neuron $h_i$ are being trained independently for each i.

For field-level training, the feedback takes the form of two values u and v of a certain field and whether they should match or not match at the field level. For a certain fixed i, the machine learning framework has $(x_i, h_i)$, where $h_i \in \{0, 1\}$ is the target for $x_i$. This feedback is useful for tuning $b_i$ and $\Theta_i$.

A data steward can tag a feedback unit with "ignore for training," which provides the data steward with finer control, because not every action that the data steward takes should trigger machine learning. For example, the customer resolution engine missed a match between a record that stores Erica Jones' maiden name Brown and a record that stores Erica Jones' married name Jones. The data steward may match these two records based on feedback from a customer service representative who interacted with Erica Jones, but the customer resolution engine should not learn that the family name Brown is a match for the family name Jones.

The matching-based machine learning models may be trained at a global level, such as on an individual organization, across all organizations, or a combination of on an individual organization and across all organizations. This combination is analogous to a two-level class hierarchy, in which the common elements are in the root class, and the particular deviations in the subclasses of the root class. The deviations may involve new elements (new fields, such as custom fields) or involve overriding root class behavior in particular subclass scenarios. The machine learning analog of overriding root class behavior by subclass behavior is for trusting an individual organization model over the global model in certain scenarios.

Assuming that feedback arrives abundantly, the following is expected. When the two city values are identical (such as when both are San Francisco), sometimes the person records will match and sometimes the person records will not match. These matching results will teach the machine learning framework that a match on city alone is insignificant. This will get expressed in a relatively low value of $h_{city}$, even when there is a city match. When the two cities are different, especially geographically wide apart (such as San Francisco and New York City) the city mismatch will tend to strongly predict a record-level mismatch. The machine learning framework will learn this lesson in the form of a suitably high $b_{city}$.

For example, the machine learning framework learns $b_i=0.80$ and $\Theta_i=0.90$ for the city field. The bias value is interpreted as saying that any match on city that scores less than 0.80 (such as 80% similarity of the strings) influences a record-level match negatively, all the way down to negative 0.80. The lowest score occurs when $x_i$ is 0. In this case, the input to the sigmoid function becomes $0.8*(-1)+0=-0.8$. For this interpretation, $\sigma$ in Equation 3 is generalized slightly, allowing it to be the tan h function instead. This is equivalent to replacing $\sigma(b_i x_0 + \Theta_i x_i)$ in Equation 3 by $2*\sigma(b_i x_0 + \Theta_i x_i)-1$. When the tan h function's input is negative (as when the input is −0.8, which happens when $x_i$ is 0), for interpretability purposes at least, $h_i$ should also be negative. $h_i$ being negative has the interpretation that when $x_i$ is low (here 0), this match score provides negative evidence, which detracts from the overall record-level match score. For example, if two records stored (John Smith, city=missing) and (John Smith, city=missing) then the record-level match score should be higher than if the two records stored (John Smith, city=San Francisco) and (John Smith, city=New York). That is negative evidence on city match detracts from the overall record-level match score. Using tan h to get $h_{city}$ makes this detraction transparent. Therefore, in this example even when the two cities match exactly, such as when $x_{city}$ equals 1, the impact of this fact alone on a record-level match is low at 0.10.

The machine learning framework models field combinations by adding input neurons for each such combination, and then adding corresponding hidden layer neurons. As expected, when the match score $x_i$ of such a field combination is high (close to 1), this strongly predicts a record-level match. Therefore, $h_i$ should be close to 1. When there is not a match on this field-combination, $h_i$ should be close to 0, which does not in of itself imply a record-level mismatch, but just indicates that there is no match on that field combination.

Intuition would suggest that instances of this field combination whose $x_i$ is close to 1 will have $h_i$ close to 1 (if not exactly 1) and if not then $h_i$ should be close to 0. Qualitatively this implies that $\Theta_i$ will be close to 1 and $b_i$ will be close to 0. That is, when there is a match on this field-combination, such as when $h_i$ is close to 1, this should contribute strong positive evidence for a record-level match. By contrast, the default value of $b_i$ (0) works. This is because by design $x_i$ will tend to be either close to 1 or close to 0 because $x_i$ is the product of multiple field-level scores. The particular learned values may matter, for prediction accuracy. On the face of it, this problem of learning to predict $h_i$ from $x_i$ may seem an easy problem, due to focusing on the AND nature of the transfer function. Machine learning is used because this approach is more general (and thereby potentially more accurate) as it can produce fuzzier AND-like behaviors (of which the hard AND is a special case). Said another way, if certain match rules are better predictors than others, these distinctions will show up in the parameters that predict $h_i$ from $x_i$.

The following is an example of a positively labeled record-level instance:

| First_name | last_name | address  | city          |
|------------|-----------|----------|---------------|
| John       | Smith     | 1 Market | San Francisco |
| J          | Smith     | Market   | San Francisco |

A data steward is asserting that these two records should match, but the customer resolution engine does not match these records because the overall match score according to Equation 3 is significantly less than 1, such that the machine learning framework needs to learn parameter values that will result in Equation 3's overall match score increasing and becoming closer to 1. For this example, the machine learning framework has configured the match rule R1: first name matches, last name matches, and street address matches. For this example, the (including composite) field-level match scores are

| fn_match | ln_match | add_match | city_match | R1_match |
|----------|----------|-----------|------------|----------|
| 0.8      | 1.0      | 0.8       | 1.0        | 0.7      |

The weights from the hidden layer neurons to the output layer neuron that correspond to these are

| fn_weight | ln_weight | add_weight | city_weight | R1_weight | $w_0$ |
|---|---|---|---|---|---|
| 0.9 | 0.9 | 0.9 | 0.5 | 0.3 | 0.2 |

The weight of 0.3 for R1 indicates that the machine learning framework has yet to learn to trust R1 sufficiently.

The effect of the feedback from this missed match will be to increase the first five weights and reduce the last weight, $w_0$. The reason that $w_0$ is reduced is because $h_0$ is −1, whereas all the other $h_i$'s are positive. The prospective weight changes for the individual fields may be compared against the prospective weight changes for the field combination R1. For example, $h_{city}$ is already low, as expected, because the machine learning framework has already learned that a match on city in of itself does not predict a record-level match. For this example, $h_{R1}$ is high so that the machine learning framework may be sensitive to a match on match rule R1 even if the machine learning framework has yet to learn to trust R1 sufficiently. The trust for R1 is controlled by $w_{R1}$, while the sensitivity for R1 is controlled by $h_{R1}$. Since $h_{R1}$ is high, the weight $w_{R1}$ will be increased more than the weight $w_{city}$. In effect the machine learning framework is reasoning that increasing $w_{city}$ would not be correct because there is already enough evidence that a match on city alone is insufficient for a record-level match. However, since $h_{R1}$ is high, it is more plausible that $w_{R1}$ is not sufficiently high. Said another way, a unit increase in $w_{R1}$ moves the needle more than a unit increase in $w_{city}$, so it makes sense to increase $w_{R1}$ more. The differing ways the machine learning framework handles $w_{city}$ and $w_{R1}$ may be reasoned as follows. For $w_{city}$, the machine learning framework has already learned through a lot of data that a match on city alone does not predict a record-level (i.e. person-level) match. However, the initial value for $w_{R1}$ is low for a different reason, namely that this is a new rule for which the machine learning framework has not established trust yet. The machine learning framework has already learned to distrust a city match alone, but the machine learning framework is starting off being conservative on $w_{R1}$ only because the machine learning framework has not yet seen the effect of this new rule, such that being more flexible on changing $w_{R1}$ makes more sense.

For a negative example: of a record level match:

| first_name | last_name | address | city |
|---|---|---|---|
| John | Smith | 1 Market | New York |
| J | Smith | 10 Main St | San Francisco |

For this example, the machine learning framework has configured the match rule R1: first name matches and last name matches and street address matches. For this example, the field-level match scores are:

| fn_match | ln_match | add_match | city_match | R1_match |
|---|---|---|---|---|
| 0.8 | 1.0 | 0.2 | 0 | 0.2 |

The weights from the hidden layer neurons to the output layer neuron that correspond to these are:

| fn_weight | ln_weight | add_weight | city_weight | $w_0$ | R1_weight |
|---|---|---|---|---|---|
| 0.5 | 0.5 | 0.5 | 0.5 | 0.2 | 0.9 |

These weights may be interpreted as meaning that by now the machine learning framework has learned that matches on individual fields do not predict a record level match, but that a match on R1 does predict a record level match.

Since the overall match score is high but the data steward assigned a record-level match label of 0, the machine learning framework wants to decrease all weights other than $w_0$ and increase $w_0$. Increasing $w_0$ makes the overall system slightly more conservative. Reasoning as before, since the first_name_match and last_name_match scores are individually high and the overall records still do not match, the machine learning framework learns to rely even less on the individual first and last name matches. This has the result of decreasing the fn_weight and the ln_weight significantly. By contrast, since the R1_match is low, the machine learning framework hardly needs to decrease the R1_weight. This is saying that since the match rule R1 did not even fire on this instance, the match rule R1 could not possibly be responsible for the false match.

The customer resolution engine can cleanse, normalize, and enrich entity data as needed. For example, a traditional match rule for uniquely identifying a person may process the data set that includes "John Smith/1 Main St, San Francisco, Calif. 94105" and "John Smith/11 Main St, San Francisco, Calif. 94105," and identify two unique people. While a traditional match rule can match addresses by using "fuzzy" strings, in isolation this fuzzy matching can lead to false positives, as there could be two different John Smiths at different addresses. In contrast, the customer resolution engine can more intelligently apply matching rules by incorporating customer data reliability into the matching process. For this example, the customer resolution engine captures and leverages data validation and enrichment attributes as part of the record fields to determine that "11 Main St" is not a valid street address for "San Francisco, Calif. 94105," infer a data entry error in the street number, and then identify the nearest string or geo-proximity match as a reliable candidate, thereby identifying only one unique John Smith on Main Street in San Francisco.

The customer resolution engine can use a similar approach in assessing reliability of a record field for uniqueness. For example, a traditional match rule "Name AND (Phone Number OR Email)" would process the data set that includes "John Smith/415-555-1212/john.smith@gmail.com," "John Smith/415-555-1212/john_smith@gmail.com," and "Cary Jones/415-555-1212/cary@joneses.com," and then identify two unique people, John Smith and Cary Jones. In contrast, the customer resolution engine can more intelligently apply matching rules by identifying how many unique source records, names, and email addresses relate to any given phone number, or vice versa. By identifying that a specific phone number is commonly used across many records, where other match condition fields did not match, such as name and email address, the customer resolution engine can apply a matching rule that processes the specific phone number as a shared record field, which is not a unique record field, thereby identifying two unique John Smiths who share the phone number 415-555-1212.

Feedback from data stewards for merging records needs to be expressed suitably for the machine learning framework to be able to effectively leverage the feedback for merging records. For an example of individual field-level feedback, various matched records in cluster of records for a master profile store the values Bob, Robert, B, and R. in the records' first name field, and the customer resolution engine assigns R. as the highest priority, or official, first name in the master profile because the oldest record for the master profile stores R. as the customer's first name. The data steward reviews this master profile, and thinks that the official first name should be Bob or Robert instead of R. The data steward can communicate such a preference to the machine learning framework in the form of triples (field_name, preferred_field_value, disfavored_field_value), which for this example would be the triples (first_name, Bob, R) and (first_name, Robert, R). The data steward can communicate a preference to the machine learning framework by submitting a modification of the master profile, such as changing the master profile's first name field value from R. to Bob or Robert, thereby automatically generating the triple (first_name, Bob, R) or the triple (first_name, Robert, R). If the data steward changes the master profile's first name field value from R. to Robert, the triple (first_name, Robert, R.) is automatically generated based on the data steward's explicit preference for Robert over R., and the triple (first_name, Robert, Bob) is automatically generated based on the data steward's implicit preference for Robert over Bob. The data steward can also communicate a preference to the machine learning framework by specifying relative preferences for a field's values, such as by selecting a lower preference for R. than the selected preferences for Bob or Robert, thereby automatically generating the triple (first_name, Bob, R) and the triple (first_name, Robert, R).

The values of certain fields are more consistent when combined together, such as the combination of the geographic fields for street_address, city, postal code, state, and country. When the customer resolution engine is selecting the highest priority values of these composite fields for the master profile, selecting one value from one record and another value from another record may result in a combination of inconsistent values. That is, the values of these composite fields in any one record are more likely to be internally consistent than values of these fields that are selected from different records. The data steward can communicate such a preference to the machine learning framework in the form of triples (street_address, city, postal code, state, and country composite fields; preferred_street_address, city, postal code, state, and country; disfavored_street_address, city, postal code, state, and country). The data steward can communicate a preference to the machine learning framework by submitting a modification of the master profile, such as changing the master profile's street_address, city, postal code, state, and country composite fields, or by specifying a preference for composite field values of one record and a different preference for the composite field values of another record. If composite fields store the values NYC, N.Y., USA; New York City, N.Y., US; New York City, N.Y., United States; and the data steward changes the master profile's first name field value from NYC, N.Y., USA to New York City, N.Y., US; the triple (city, state, and country composite fields; New York City, N.Y., US; NYC, N.Y., USA) is automatically generated based on the data steward's explicit preference for New York City, N.Y., US; over NYC, N.Y., USA. Additionally, the triple (city, state, and country composite fields; New York City, N.Y., US; New York City, N.Y., United States) is automatically generated based on the data steward's implicit preference for New York City, N.Y., US over New York City, N.Y., United States.

Sometimes one record in a cluster of records for a master profile may stand out as the record that stores more of the best values for the master profile than any other record in the cluster. The data steward can identify this best record to the machine learning framework, even if only some of the values in the best record should be selected for the master profile. Even though the data steward's identification of such a record as the best record for the master profile may not result in submitting any modification of the master profile, the machine learning framework can learn from the implied preferences for each field value and each composite field value.

The above scenarios may be abstracted into the following primitives: individual field-level triple—(field_name, preferred_value, less_preferred_value), multiple field-level triple—(composite_field_name, composite_preferred_value, composite_less_preferred_value), and record-level double—(preferred_record, less_preferred_record). The key difference between the composite field-level and the record-level is that all of the preferred composite field values are selected together whereas not all of the preferred record's field values need be selected together. For example, there is no obvious reason to select the value of the first name field along with the value of the phone number field from the same preferred record.

As with the matching and clustering models, the merging model is of three types: at the level of scalar values, at the level of composite values, and at the level of records. The machine learning framework's architecture can effectively leverage such tri-level feedback. At a high level, this architecture for merging is roughly similar to the architecture for matching and clustering. However, the matching feedback is expressed in terms of a binary label on a pair of scalar, composite, or record-level values, with the binary label specifying whether or not the two corresponding values should match. In contrast, the merging feedback takes the form of the desired rank order between two values.

This fundamental difference between the matching and clustering models and the merging model manifests itself at the lowest level of fields. The merging model uses ordered pairs (u, v) of values of a certain field in which the value u is preferred over the value v. Given the ordered pair (u, v), the label is 1 if the value u is preferred over the value v, and the label is 0 if the value u is not preferred over the value v. Two labeled instances (u, v, 1) and (v, u, 0) are constructed from each ordered pair (u, v).

In the matching and clustering models, a pair of values is treated symmetrically, specifying whether or not the pair of values match each other, such that the order of the values is irrelevant. In contrast, the asymmetry of the pair of values is crucial for the merging model because reversing the order of the values results in reversing the label's value. In the matching and clustering models, the match scores from field-level matchers are used as predictors of the overall record-level "matches or does not match" classification. Therefore, the matching and clustering models did not explore more advanced features. In the merging model, the feature design itself is an unexplored area, and non-obvious. The merging model focuses on feature engineering because the field-level match scores are not applicable for the merging model.

The merging model may be based on differential features. Given an ordered pair (u, v) of values, features of the value u and the value v are identified that are effective at predicting whether or not the value u is a better value than the value v for their corresponding field. Clearly these features should be asymmetric, such that reversing the order of the value u and the value v reverses the label values. A differential approach is formalized: let f(x) denote a certain numeric-valued function of the value x. The differential feature is derived from f:

$$\Delta f_{uv} = f(u) - f(v) \qquad \text{Equation 4}$$

An important subclass of differential features is those features in which f(x) forms a certain fitness score. More formally, let b(x) denote a value of a certain base feature in x. f(x) f(b(x)) is used to denote the fitness of b(x) as estimated from a sample of values of x. The intuition behind fitness features is simple, along a suitably chosen dimension, a fit value is a better value. For example, when using the number of digits as a base feature for United States zip codes, the associated fitness score would conclude, as desired, that 5-digit numbers are a better fit to United States zip codes than 3-digit numbers. Any given field may have multiple fitness-based features, with the fitness features measured along different dimensions. A base feature of a fitness feature is not required to be numeric.

Fitness-based features are easily trained on a data set of "good" values of a given field. Generally, a data set of realistic values is used for training, and frequency is used as a proxy for "good" values. Fitness may be modeled in terms of P(b|field), the likelihood of a base feature b having a certain value for the given field. In this setting, fitness is defined as:

$$f(x) = f(b(x)|\text{field}) = \log P(b(x)|\text{field}) \qquad \text{Equation 5}$$

When Equation 5 is applied to Equation 4, the result is subtracting log-probabilities, which is probabilistically correct.

A fitness model may be estimated in an unsupervised way, from a data set of frequency-preserved values of a field. This modeling enables the building of a purely unsupervised quality score, which can possibly aggregate values from multiple fitness features. In this approach, a quality score is built directly from fitness scores, which is attractive when the data set lacks sufficiently rich labels to train differential features.

Suitable models for the following first name features may be estimated non-parametrically from a data set of (first name, frequency) pairs. From the resulting models, feature-specific fitness scores may be obtained for any particular first name.

A n-grams model is a Markov model of how well the various substrings in a string fit a model of first names. This model can usefully predict, for instance, that the substring xyz and the substrings aaaa are unlikely to be in first names. An n-grams model takes the form of $P_n(c_n|c_1, c_2, \ldots c_{n-1})$, where $c_n$ is nth character in the string and $c_1, c_2, \ldots c_{n-1}$ are the previous n−1 characters. The model computes the probability of the nth character in the string given the previous n−1 characters. To compute the probability of an arbitrary string $x_1, x_2, \ldots x_m$ of length m≥n, k-gram models are needed for every k ∈ {1, ..., n}. First, $P_1(x_1)$ is computed, using the 1-gram model. Next, $P_2(x_2|x_1)$ is computed, using the 2-gram model. Therefore, to compute $x_k$ for x≤n, the k-grams model is used. If k>n, the n-grams model is used to compute $P_n(x_k|x_{k-(n-1)}, \ldots x_{k-1})$. That is, to compute this probability, only the last n characters of the string ending at $x_k$ are used. For example. if n=3, the probability of the string abxyze under the k-grams models, k≤3 is $P_1(a) * P_2(b|a) * P_3(x|ab) * P_3(y|bx) * P_3(z|xy) * P_3(e|yz)$. To train the k-gram models for all k≤n for a data set of strings, such as a set of first names. $P_1(c)$ is the relative frequency of character c in this data set across all characters. As an example, if the data set just had two strings: axde and bstaxe, then $P_1(a) = 2/10$ because there are 10 characters of which two characters are a's. More generally, $P_k(x_k|x_1, x_2, \ldots x_{k-1})$ is the fraction of occurrences of $x_1, x_2, \ldots x_{k-1}$ in which the next character is $x_k$. Therefore, P_2 (x|a)=1 because every time a occurs it is followed by an x. Similarly, P_2 (d|x)=½ because x occurs twice and in one of these occurrences x is followed by d.

A vowel-consonant distribution models the distribution of vowels and consonants in (V, C) pairs, where for a first name x, V(x) denotes the number of vowels in x and C(x) denotes the number of consonants in x. For example, the strings xyz and aaaa would have the (V, C) pairs (0, 3) and (4, 0), each of which is a highly unusual distribution of vowels or consonants for a first name. A name length distribution is based on the distribution of a first name's length, such that a very long string is unlikely to be a first name.

For a given postal code p, regardless of the country, the bivariate feature (num_digits(p), num_alpha_chars(p)) may be used. A fitness score may be associated with this feature by training on a data set of postal codes. The fitness model would assign, for United States zip codes, a high fitness score to (5,0) and a low fitness score to (3,0). Applying this model to more countries results in more value. Although a postal code model may have only one feature, the model can learn varying fitness distributions in different countries, just from country-specific training sets.

While the assumption that a fitter value is a better value is generally applicable, there are situations in which this assumption is inapplicable. For example, the feature contains_salutation (x) has a true value if and only if the first name x contains a salutation such as Mr, Ms, Mrs, or Dr. An organization may conclude that a first name that includes a salutation is better than a first name that lacks a salutation because a salutation helps differentiate between female first names and male first names that are common only in other countries. Another organization may conclude that a first name that lacks a salutation is better than a first name that includes a salutation because a salutation clutters up the first name.

Consequently, modeling non-fitness features may be advantageous. In these, f(x) is not a fitness associated with a base feature, rather it is a value of that feature. Since a differential feature involves subtracting feature values, a non-fitness feature also needs to be numeric-valued. Examples of non-fitness features include: f(x) is 1 if x contains a salutation and f(x) is 0 if x lacks a salutation; f(x) is 1 if x contains a medical designation such as MD or DDS, and f(x) is 0 if x lacks a medical designation; f(x) is 1 if x contains an academic designation such as Ph.D. or professor, and f(x) is 0 if x lacks an academic designation; and f(x) is 1 if x is an initial such as a single letter optionally followed by a ".", and f(x) is 0 if x is not an initial.

The following city fitness features may be used as stand-alone features or as components of composite features when city is modeled as a component of a composite address such as (address, city, postal, state, country). The following city fitness features are derived from the base features. f(x) is the number of one-letter words in x, which is motivated by the thinking that the occurrence of single-letter words in city names is unusual. f(x) is the number of digits in x, which is motivated by the thinking that the occurrence of digits in city names is unusual. f(x) is the number of special characters in x, which is motivated by the thinking that the occurrence of special characters in city names is unusual. f(x)=x means that the feature value is the value x itself, which is motivated by the thinking that that frequent values are fitter than infrequent values. To avoid the frequency fitness model from getting exceedingly complex, all sufficiently infrequent values may be truncated to zero.

The following city non-fitness features may be used as stand-alone features. f(x) is the length of x, which is built on the observation that abbreviated city names are shorter than full city names. The differential version of this non-fitness feature discriminates between abbreviated and full city names, thereby enabling an organization to consistently favor one length of names over the other length of names. f(x) is 1 if x is an acronym and f(x) is 0 if x is not an acronym, thereby enabling an organization to consistently favor or disfavor acronyms. f(x) is the number of abbreviations of directional qualifiers that x contains, such that f(x) is 0 for South San Francisco and f(x) is 1 for S San Francisco. The differential version discriminates between city names that do and do not contain abbreviated directional qualifiers, thereby enabling an organization to consistently favor or disfavor directional qualifiers.

Any given field in the training set takes the form of triples (u, v, y) where y ∈ {0, 1} denotes whether or not the value u is better than the value v. Features and/or differential features are extracted from (u, v), thereby resulting in a vector of features, and a data set of (feature vector, y) pairs. Any standard machine learning algorithm may use the vector of features and the data set to learn a predictive model. The machine learning framework uses the learned model to predict, on a new instance (u, v), the likelihood that the value u is better than the value v, and then converts this likelihood into a suitable score.

The field level, or scalar values, may be generalized to the field combination level, or tuple values. As before, given the ordered pair (u, v), the label is 1 if the value u is preferred over the value v and the label is 0 if the value u is not preferred over the value v. However, this time u and v are tuple values, such that a tuple value on a given set of fields is composed of an assignment of a scalar value to each of them. For example, a field-combination={city, state, country}. tuple value={city: san francisco, state: ca, country: usa}

Tuple values are not processed as scalar values because there would be a combinatorial "explosion" of values. The number of distinct tuple values is exponentially more than the number of distinct scalar values of any of its comprising fields. This combinatorial explosion would require a huge amount of training data to avoid overfitting, because instances are multiple values, instead of single values, thereby resulting in a combinatorial explosion of values.

The way around this combinatorial explosion of values is to decompose tuple values into smaller parts. That is, instead of trying to learn a model of whether or not the value u is better than the value v, the machine learning framework tries to learn models of whether certain parts of the value u are better or not than corresponding parts of the value v, and generates part-specific scores, which are aggregated to a tuple-level score. For example, the customer resolution engine determines whether a certain combination of city, state, and country is better than another combination of city, state, and country in records for a master profile. The merging model decomposes the three-field combination into three independent fields for city, state, and country, and generates the score functions $S_{city}$, $S_{state}$, and $S_{country}$ from which are derived a triplet-level score:

$$S_{city,state,country}(u,v)=S_{city}(u.\text{city},v.\text{city})+S_{state}(u.\text{state},v.\text{state})+S_{country}(u.\text{country},v.\text{country}) \quad \text{Equation 6}$$

This score function may be used to compare any two tuple values of this 3-field combination. The three score functions $S_{city}$, $S_{state}$, and $S_{country}$ may be trained independently, on pairs of values from their corresponding fields, thereby avoiding the combinatorial explosion. As an example, if an organization prefers state values that form full state names over state abbreviations, the machine learning framework only needs to train $S_{state}$ on pairs of states that capture these preferences, instead of training the entire 3-field combination on this preference that affects only 1 field.

However, the ability to check for consistency across the scalar values has been lost. For the example state=Ontario, country=USA, since Ontario is a Canadian province instead of a US state, the machine learning framework needs to assign a low score to this pair of values, even if the state and the country values individually score high, as many records store the names of Canadian provinces in the state field.

To effectively model both scalar values in a tuple and their combinations, interactions of scalar values are modeled, then the model is enhanced to incorporate the quality of the individual scalar values. Interactions among scalar values in a field combination are modeled as a Bayes network, in which the network's nodes are the fields, and the network's arcs model direct influences among field values. The network's parameters are learned from a data set of tuple values. In this framework, the fitness of a tuple value X is modeled based on its probability:

$$P(X)=\Pi_i p(X_i)|\text{parents}(X_i)) \quad \text{Equation 7}$$

with the fitness score, as before, =log P(X)

Figure 2A:
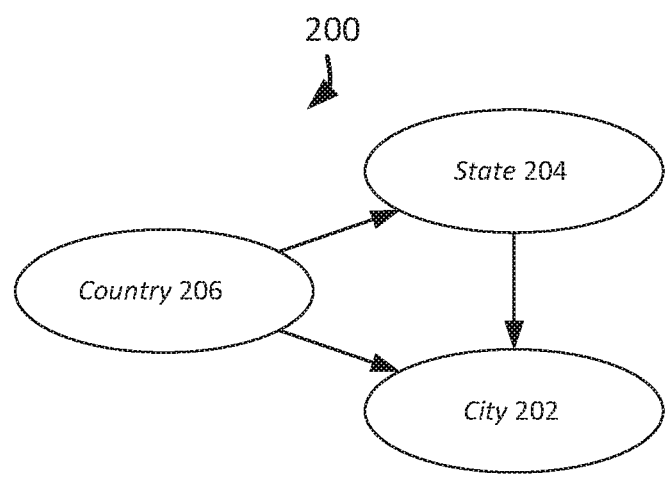
FIGS. 2A and 2B illustrate example Bayesian network models used for machine learning from data steward feedback for merging records, in an embodiment.

For example, FIG. 2A depicts a Bayes network model 200, in which the fields are city 202, state 204, and country 206, and includes the interaction between city 202, state 204, and country 206. In the Bayes network 200, state 204 is modeled as conditional on country 206, and city 202 is modeled as conditional on the combination of state 204 and country 206. The Bayes network model 200 employs three probability distributions, P(country), P(state|country) and P(city|state, country). The probability of a tuple (city=c, state=s, country=ctry) is $$=P(\text{country}=ctry)*P(\text{state}=s|\text{country}=ctry)*P(\text{city}=c|\text{state}=s,\text{country}=ctry) \quad \text{Equation 8}$$

The main reason for modeling city 202 as being conditioned on the combination of state 204 and country 206 is to handle the case when state 204 is missing, possibly but not only because the country does not have states. When state 204 is missing, the influence from country 206 on city 202 is taken into account.

An organization may prefer full city names over city name abbreviations, such as preferring the tuple (country=United States, state=New York, city=New York City) over the tuple (country=USA, state=New York, city=NYC). To capture that the first tuple should score higher than the second tuple, the approach is to augment the Bayes network model 200 with suitable distortion operations. Its easiest to describe this by viewing the base Bayes network as a generative model. A tuple may be generated in accordance with the probability distributions that the network 200 of FIG. 2A models. Country ctry is sampled from P(country), state s is sampled from P(state|country=ctry), and city c is sampled from P(city|state=s, country=ctry)

Figure 2B:
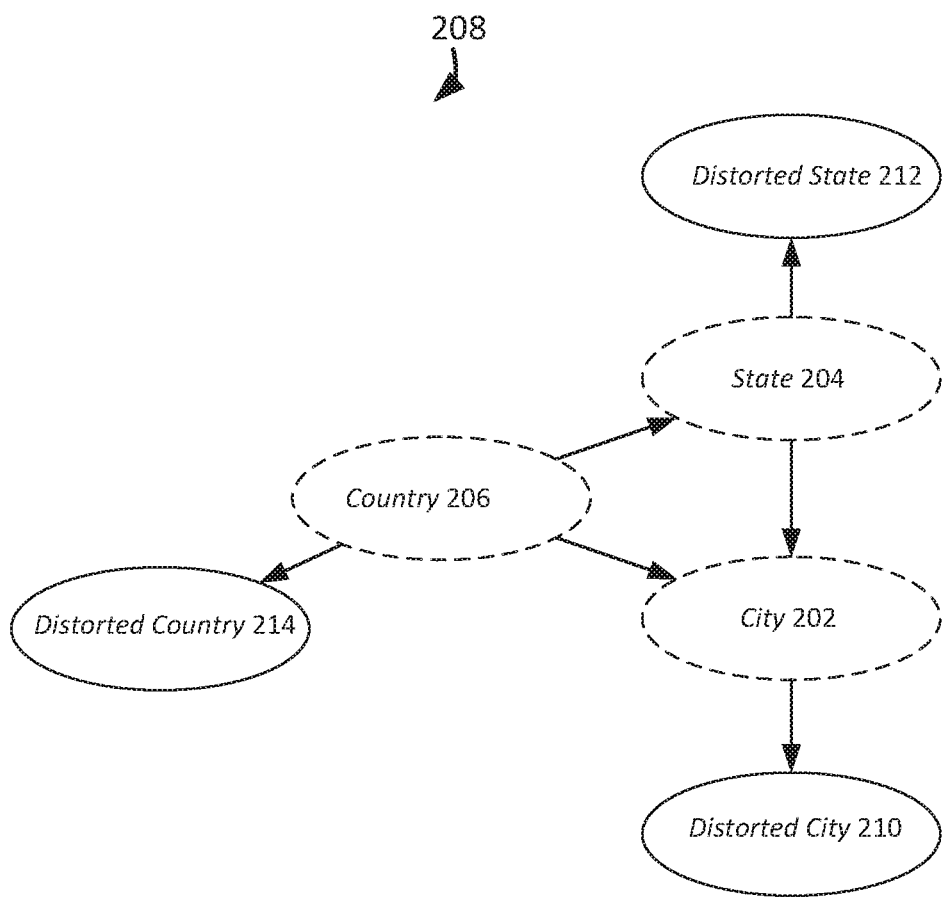

As depicted by FIG. 2B, the new Bayes network model 208 distorts each field's value in the tuple (city=c, state=s, country=ctry) independently. That is, distorted city 210 is sampled from $P_d$(city=c), distorted state 212 is sampled from $P_d$(state=s), and distorted country 214 is sampled from $P_d$(country=ctry). The augmented model 208 is still a Bayes network. This network has two nodes per field, with one node modeling normalized values, and the other node modeling distorted values. Only distorted values are observed, as the nodes modeling normalized values are latent. FIG. 2B depicts the distorted version of the Bayes network of FIG. 2A, with the dashed ovals denoting latent nodes. The probability of a tuple X on the visible variables is now more complex.

$$P(X)=\Sigma_{\bar{Y}i}\Pi_i P(X_i|Y_i)*P(Y_i||\text{parents}(Y_i))\qquad\text{Equation 9}$$

Here Y denotes a clean version of X. There may be more than one Y that could have generated X, hence the summation over Y's. For any one Y, $P(X_i|Y_i)$ models the probability of generating the distorted value $X_i$ of field i from its clean value $Y_i$. $P(Y_i|\text{parents }(Y_i))$ models the influence of the clean values of parents of field i on the clean value $Y_i$.

It is reasonable to assume that for any given $X_i$, there are only a handful of clean values $Y_i$ that could have generated $X_i$. These clean values may be captured by building an inverted map from the training set $(Y_i, X_i)$ for the distortions. There is one training set of this sort per field. All possible Y's. may be enumerated from these inverted maps.

The machine learning framework enables the customer resolution engine to generate a master profile by selecting the best individual field values and the best composite field values. If the machine learning framework has pairwise "value u is better than value v" scores at the level of individual fields, the customer resolution engine can select the best value via a tournament that compares pairs of values. This is as if the maximum was being computed under the ">" relation. If such pairwise scores do not exist, the machine learning framework would at least have fitness scores of individual values, and the customer resolution engine selects the value having the highest fitness score. At the level of a field combination, the customer resolution engine selects the tuple having the highest score according to Equation 9. To construct the overall best record for the master profile, the customer resolution engine partitions fields into field sets, with singleton field sets treated as individual fields, and higher-cardinality field sets treated as field combinations. The record composed of these best values is the best record for the master profile.

Figure 3:
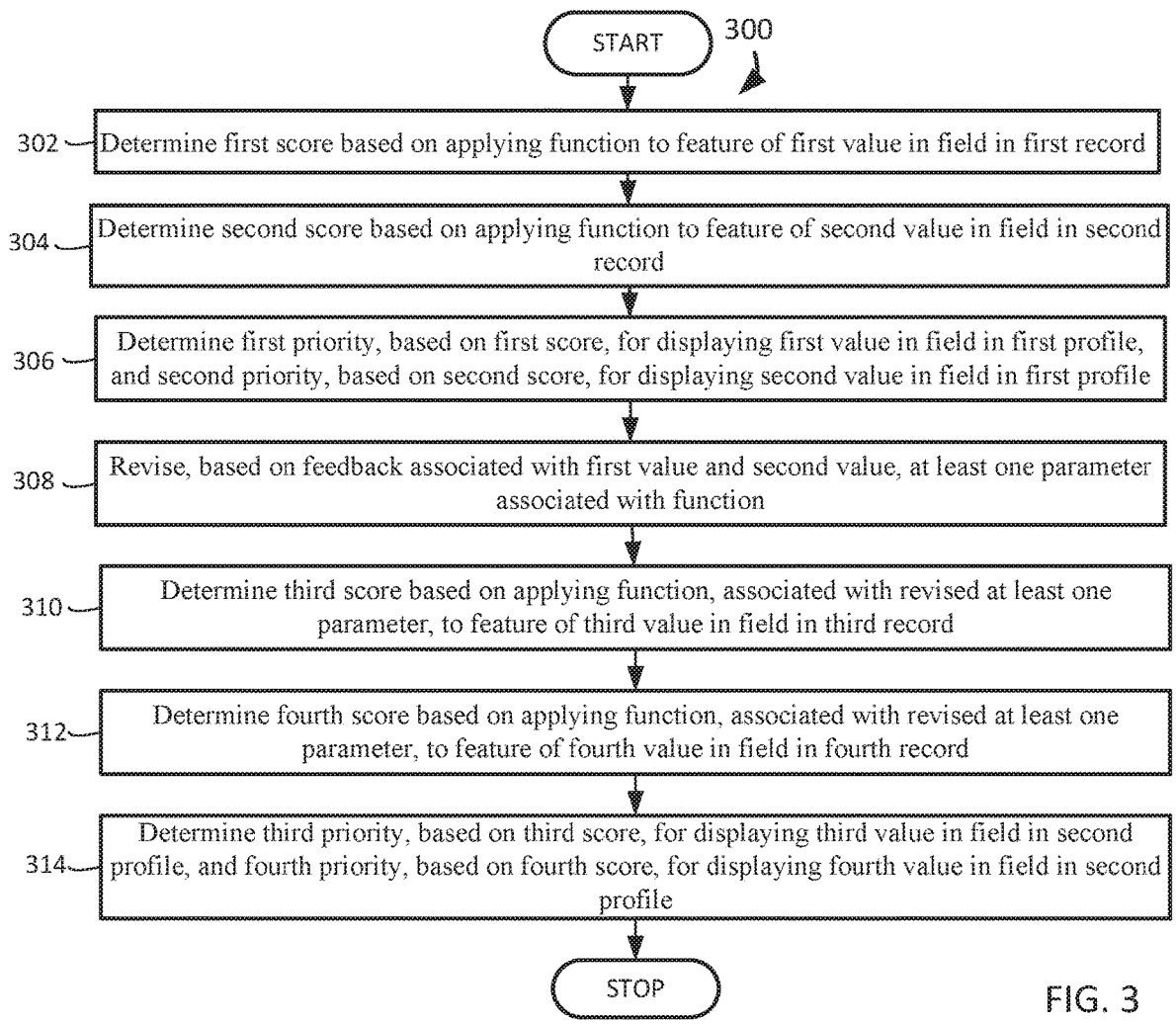
FIG. 3 is an operational flow diagram illustrating a high-level overview of a method for machine learning from data steward feedback for merging records, in an embodiment.

FIG. 3 is an operational flow diagram illustrating a high-level overview of a method 300 for machine learning from data steward feedback for merging records. A score is determined based on applying a function to a feature of a value in a field in a record, block 302. The customer resolution engine calculates a feature score for a record field value. For example, and without limitation, this can include a customer resolution engine accessing a retail record that stores Liz Smith, 1 Market Street, San Francisco, 94105, California, USA, and then applying a first name length function to the first name field's value Liz by identifying the frequency of 3 character-long first names in a sample first name data set as 0.060, and by calculating the logarithm of 0.060 as the first name length score of negative 1.22 for Liz.

A score can be a rating or a grade. A function can be a process or a relation that associates one element in one set of elements with another element in another set of elements. A feature can be a distinctive attribute or aspect of something. A value can be any symbol(s) on which an operation is performed by a computer. A field can be a part of a record that represents an item of data. A record can be the storage of at least one value in a persistent form.

A function may be based on a frequency of a specific value occurring in a set of values. A frequency can be the rate at which something occurs or is repeated in a given sample. A specific value can be the particular symbol(s) on which an operation is performed by a computer. A set can be a group of things that belong together, resemble one another, or are usually found together.

After calculating a score, another score is determined based on applying the same function to the same feature of another value in the same field in another record, block 304. The customer resolution engine calculates a feature score for another record field value. By way of example and without limitation, this can include the customer resolution engine accessing a customer service record that stores Elizabeth Smith, 1 Market Street, San Francisco, 94105, CA, USA, and applying a first name length function to the first name field's value Elizabeth by identifying the frequency of 9 character-long first names in the sample first name data set as 0.029, and by calculating the logarithm of 0.029 as the first name length score of negative 1.54 for Elizabeth.

Having calculated two scores, a first priority is determined, based on the first score, for displaying the first value in the same field in a profile, and a second priority is determined, based on the second score, for displaying the second value in the same field in the profile, block 306. The customer resolution engine determines the display priorities for profile field values. In embodiments, this can include the customer resolution engine assigning a high priority for displaying Liz at the top of the first name field in Smith's master profile, such that Liz may be the only first name displayed by the general overview page of the master profile. The customer resolution engine also assigns a low priority for displaying Elizabeth at the bottom of the first name field in Smith's master profile, such that Elizabeth may be displayed only by the details page of the master profile. Assigning the high priority for displaying Liz and the low priority for displaying Elizabeth may result in displaying Liz at the top of the first name field in Smith's master profile and displaying Elizabeth at the bottom of the first name field in Smith's master profile. The customer resolution engine assigns the high priority for Liz and the low priority for Elizabeth because the first name length score of negative 1.22 for Liz is higher than the first name length score of negative 1.54 for Elizabeth. A priority can be a condition of a thing being treated as more important than another thing. A profile can be a representation of information relating to particular characteristics of something.

After calculating the display priorities for the profile field values, at least one parameter associated with a function is revised based on feedback associated with the values, block 308. The machine learning framework learns record merging preferences from a data steward's feedback. For example, and without limitation, this can include the machine learning framework receiving the data steward's first name preference for Elizabeth over Liz, which is automatically generated in the form of first name field, Liz, Elizabeth, 0, when the data steward modifies the display order for the first names Liz and Elizabeth in Smith's master profile. The data steward may have made the modification after reviewing a customer service representative's note specifying that Smith prefers to be called Elizabeth rather than Liz. Then the machine learning framework adds pseudo counts to the 9 character-long first names in the sample first name data set to raise the corresponding frequency of 0.029 by 7% to 0.031 to reflect the data steward's preference for a 9 character-long first name. Similarly, the machine learning framework adds negative pseudo counts to (or subtracts positive pseudo counts from) the 3 character-long first names in the sample first name data set to lower the corresponding frequency of 0.060 by 7% to 0.056 to reflect the data steward's lack of preference for a 3 character-long first name. Although these examples describe the revision of two parameters as adding pseudo counts, the revision of any number of revised parameters may be in any action, such as adding pseudo counts, or modifying weights, gains, biases, and/or sub-functions.

Feedback may be received from a data steward and may include a first value, a second value, and a preference for the first value or the second value. Feedback can be information about a process, which can be used as a basis for improvement. A parameter can be a numerical factor forming one of a set that defines a system or establishes the conditions of its operation. Probability can be the likelihood of something being the case.

Following the revision of the parameter(s), a score is determined based on applying a function, associated with any revised parameter(s), to the same feature of a value in the same field in a record, block 310. The customer resolution engine uses the revised parameter(s) to calculate a feature score for a record field value. By way of example and without limitation, this can include the customer resolution engine accessing a retail record that stores Al Jones, 1 Wall Street, New York City, N.Y., 10005, United States, and applying the first name length function to the first name field's value Al by identifying the frequency of 2 character-long first names in the sample first name data set as 0.030, and by calculating the logarithm of 0.030 as the first name length score of negative 1.52 for Al. A revised parameter can be a changed numerical factor forming one of a set that defines a system or establishes the conditions of its operation.

Having calculated a score, another score is determined based on applying a function, associated with any revised parameter(s), to the same feature of another value in the same field in another record, block 312. The customer resolution engine uses the revised parameter(s) to calculate another feature score for another record field value. In embodiments, this can include the customer resolution engine accessing a customer service record that stores Alexander Jones, 1 Wall St, NYC, N.Y., 10005, USA, and then applying a first name length function to the first name field's value Alexander by identifying the revised frequency of 9 character-long first names in the sample first name data set as 0.031, and by calculating the logarithm of 0.031 as the first name length score of negative 1.51 for Alexander.

After the two scores are calculated, a first priority is determined, based on the first score, for displaying a first value in the same field in a profile and a second priority is determined, based on the second score, for displaying a second value in the same field in the profile, block 314. The customer resolution engine uses the revised parameter(s) to determine the display priorities for profile field values. For example, and without limitation, this can include the customer resolution engine assigning a high priority for displaying Alexander at the top of the first name field in Jones' master profile, such that Alexander may be the only first name displayed by the general overview page of the master profile. The customer resolution engine also assigns a low priority for displaying Al at the bottom of the first name field in Jones' master profile, such that Al may be displayed only by the details page of the master profile. Assigning the high priority for displaying Alexander and the low priority for displaying Al may result in displaying Alexander at the top of the first name field in Jones' master profile and displaying Al at the bottom of the first name field in Jones' master profile. The customer resolution engine assigns the high priority to Alexander and the low priority to Al because the first name length score of negative 1.51 for Alexander is higher than the first name length score of negative 1.52 for Al. By learning the data steward's preference for 9 character-length first names, and slightly modifying the first name frequencies used by the first name length function, the machine learning framework enables the customer resolution engine to assign a priority for displaying Alexander instead of Al at the top of the first name field in Jones' master profile.

The method 300 may be repeated as desired. Although this disclosure describes the blocks 302-314 executing in a particular order, the blocks 302-314 may be executed in a different order. In other implementations, each of the blocks 302-314 may also be executed in combination with other blocks and/or some blocks may be divided into a different set of blocks.

In addition to assigning values' display priorities based on a score for a single feature of each record field value, the customer resolution engine can assign values' display priorities based on a score for multiple features of each record field value. A score is determined based on applying a function to a feature of a value in a field in a record and optionally by applying another function to another feature of the value in the field in the record. The customer resolution engine can calculate a multiple-feature score for a record field value. For example, the customer resolution engine accesses a retail record that stores Liz Smith, 1 Market Street, San Francisco, 94105, California, USA, and applies a first name vowels-consonants function to the 1 vowel i and the 2 consonants L and z by identifying the frequency of 1 vowel-2 consonants first names in the sample data set as 0.030, and calculating the logarithm of 0.030 as the first name vowels-consonants score of negative 1.52 for Liz. The customer resolution engine also applies a first name length function to the first name field's value Liz by identifying the frequency of 3 character-long first names in the sample first name data set as 0.060, and by calculating the logarithm of 0.060 as the first name length score of negative 1.22 for Liz.

Although this example describes the application of two functions to two features of a record field value, the customer resolution engine can apply any number of functions to any number of corresponding features of a record field value. While this example describes the application of multiple functions to closely-related features of a record field value, the customer resolution engine can apply multiple functions to any types of features of a record field value. For example, the first name features for vowels-consonants and character length are closely related, as the 1 vowel-2 consonants first name Liz is inherently 3 characters in length, such that an organization may select to apply multiple functions to features that are not closely related. However, the customer resolution engine may still calculate significantly different scores by applying multiple functions to features that are closely related. For example, the first name Chris has 1 vowel and 4 consonants, which occurs relatively infrequently in the first names sample data set, and a total of 5 characters, which occurs relatively frequently in the first names sample data set, such that applying the first name vowels-consonants function to Chris results in a relatively low score, while applying the closely-related first name length function to Chris results in a relatively high score.

Then the customer resolution engine multiplies the first name vowels-consonants score of negative 1.52 for Liz by the first name vowels-consonants weight of 0.50 to result in the weighted first name vowels-consonants score of negative 0.76 for Liz. Similarly, the customer resolution engine multiplies the first name length score of negative 1.22 for Liz by the first name length weight of 0.50 to result in the weighted first name length score of negative 0.61 for Liz. Finally, the customer resolution engine adds the weighted first name vowels-consonants score of negative 0.76 for Liz to the weighted first name length score of negative 0.61 for Liz to result in the combined first name score of negative 1.37 for Liz. Although this example describes the combination of two weighted scores to create a combined score, the customer resolution engine can combine any number of weighted scores to create the combined score.

After calculating a score, another score is determined based on applying the same function to the same feature of another value in the same field in another record and optionally by applying the other function to the other feature of another value in the same field in another record. The customer resolution engine can calculate a multiple-feature score for another record field value. For example, the customer resolution engine accesses a customer service record that stores Elizabeth Smith, 1 Market Street, San Francisco, 94105, CA, USA, and applies a first name vowels-consonants function to the 4 vowels E, i, a, and e and the 5 consonants l, z, b, t, and h by identifying the frequency of 4 vowels-5 consonants first names in the sample data set as 0.015, and by calculating the logarithm of 0.015 as the first name vowels-consonants score of negative 1.82 for Elizabeth. The customer resolution engine also applies a first name length function to the first name field's value Elizabeth by identifying the frequency of 9 character-long first names in the sample first name data set as 0.029, and by calculating the logarithm of 0.029 as the first name length score of negative 1.54 for Elizabeth.

Then the customer resolution engine multiplies the first name vowels-consonants score of negative 1.82 for Elizabeth by the first name vowels-consonants weight of 0.50 to result in the weighted first name vowels-consonants score of negative 0.91 for Elizabeth. The customer resolution engine also multiplies the first name length score of negative 1.54 for Elizabeth by the first name length weight of 0.50 to result in the weighted first name length score of negative 0.77 for Elizabeth. Finally, the customer resolution engine adds the weighted first name vowels-consonants score of negative 0.91 for Elizabeth to the weighted first name length score of negative 0.77 for Elizabeth to result in the combined first name score of negative 1.68 for Elizabeth.

Having calculated two scores, a first priority is determined, based on the first score, for displaying a first value in the same field in a profile and a second priority is determined, based on the second score, for displaying a second value in the same field in the profile. The customer resolution engine determines the display priorities for profile field values. For example, the customer resolution engine assigns a high priority for displaying Liz at the top of the first name field in Smith's master profile, such that Liz may be the only first name displayed by the general overview page of Smith's master profile. The customer resolution engine also assigns a low priority for displaying Elizabeth at the bottom of the first name field in Smith's master profile, such that Elizabeth may be displayed only by the details page of Smith's master profile. Assigning the high priority for displaying Liz and the low priority for displaying Elizabeth may result in displaying Liz at the top of the first name field in Smith's master profile and displaying Elizabeth at the bottom of the first name field in Smith's master profile. The customer resolution engine assigns the high priority to Liz and the low priority to Elizabeth because the combined first name score of negative 1.37 for Liz is higher than the combined first name score of negative 1.68 for Elizabeth.

After calculating the display priorities for the profile field values, at least one parameter associated with the first function, and optionally the second function, is revised based on feedback associated with the values. The machine learning framework learns record merging preferences from the data steward's feedback. For example, the machine learning framework receives the data steward's first name preference for Elizabeth over Liz, which is automatically generated in the form of first name field, Liz, Elizabeth, 0, when the data steward modifies the display order of the first names Liz and Elizabeth in Smith's master profile. The data steward may have made the modification after reviewing a customer service representative's note specifying that Smith prefers to be called Elizabeth rather than Liz. Then the machine learning framework adds pseudo counts to the 4-vowels 5-consonants first names in the sample first name data set to raise the corresponding frequency of 0.015 by 7% to 0.016, and adds pseudo counts to the 9 character-long first names in the sample first name data set to raise the corresponding frequency of 0.029 by 7% to 0.031, to reflect the data steward's preference for a 9 character-long first name with 4 vowels and 5 consonants. Similarly, the machine learning framework adds negative pseudo counts to the 1-vowel 2-consonants first names in the sample first name data set to lower the corresponding frequency of 0.030 by 7% to 0.028, and adds negative pseudo counts to the 3 character-long first names in the sample first name data set to lower the corresponding frequency of 0.060 by 7% to 0.056, to reflect the data steward's lack of preference for a 3 character-long first name with 1 vowel and 2 consonants.

Since the data steward prefers Elizabeth, the first name length score of negative 1.22 for Liz is 0.32 greater than the first name length score of negative 1.54 for Elizabeth, and the first name vowels-consonants score of negative 1.52 for Liz is only 0.30 greater than the first name vowels-consonants score of negative 1.82 for Elizabeth, the machine learning framework learns an implied preference by the data steward for the first name vowels-consonants score that favors Liz less than the first name length scores favor Liz. Therefore, the machine learning framework reduces the first name length weight of 0.50 by 8% to 0.46 and increases the first name vowels-consonants weight by 8% to 0.54 to reflect the data steward's implied preference for the first name vowels-consonants score.

Following the revision of the parameter(s), a score is determined based on applying a function, associated with any revised parameter(s), to a feature of a value in the same field in a record, and optionally by applying another function, associated with any revised parameter(s), to another feature of the value in the same field in the record. The customer resolution engine uses the revised parameter(s) to calculate another multiple feature score for another record field value. For example, the customer resolution engine accesses a retail record that stores Al Jones, 1 Wall Street, New York City, N.Y., 10005, United States, and applies a first name vowels-consonants function to the 1 vowel A and the 1 consonant l by identifying the frequency of 1 vowel-1 consonant first names in the sample data set as 0.015, and calculating the logarithm of 0.015 as the first name vowels-consonants score of negative 1.82 for Al. The customer resolution engine also applies the first name length function to the first name field's value Al by identifying the frequency of 2 character-long first names in the sample first name data set as 0.030, and by calculating the logarithm of 0.030 as the first name length score of negative 1.52 for Al.

Then the customer resolution engine multiplies the first name vowels-consonants score of negative 1.82 for Al by the revised first name vowels-consonants weight of 0.54 to result in the weighted first name vowels-consonants score of negative 0.98 for Al. The customer resolution engine also multiplies the first name length score of negative 1.52 for Al by the revised first name length weight of 0.46 to result in the weighted first name length score of negative 0.70 for Al. Finally, the customer resolution engine adds the weighted first name vowels-consonants score of negative 0.98 for Al to the weighted first name length score of negative 0.70 for Al to result in the combined first name score of negative 1.68 for Al.

Having calculated a score, another score is determined based on applying a function, associated with any revised parameter(s), to the feature of another value in the same field in another record, and optionally by applying another function, associated any revised parameter(s), to another feature of the other value in the same field in the other record. The customer resolution engine uses the revised parameter(s) to calculate yet another multiple feature score for another record field value. For example, the customer resolution engine accesses a customer service record that stores Alexander Jones, 1 Wall St, NYC, N.Y., 10005, USA, and applies a first name vowels-consonants function to the 4 vowels A, e, a, and e, and the 5 consonants l, x, n, d, and r by identifying the revised frequency of 4 vowels-5 consonants first names in the sample data set as 0.016, and by calculating the logarithm of 0.015 as the first name vowels-consonants score of negative 1.80 for Alexander. The customer resolution engine also applies a first name length function to the first name field's value Alexander by identifying the revised frequency of 9 character-long first names in the sample first name data set as 0.031, and by calculating the logarithm of 0.031 as the first name length score of negative 1.51 for Alexander.

Then the customer resolution engine multiplies the first name vowels-consonants score of negative 1.80 for Alexander by the revised first name vowels-consonants weight of 0.54 to result in the weighted first name vowels-consonants score of negative 0.97 for Alexander. The customer resolution engine also multiplies the first name length score of negative 1.51 for Alexander by the revised first name length weight of 0.46 to result in the weighted first name length score of negative 0.69 for Alexander. Finally, the customer resolution engine adds the weighted first name vowels-consonants score of negative 0.97 for Alexander to the weighted first name length score of negative 0.69 for Alexander to result in the combined first name score of negative 1.66 for Alexander.

After the two scores are calculated, a first priority is determined, based on the first score, for displaying a first value in the same field in a profile, and a second priority is determined, based on the second score, for displaying a second value in the same field in the profile. The customer resolution engine uses the revised parameter(s) to determine the display priorities for profile field values. For example, the customer resolution engine assigns a high priority for displaying Alexander at the top of the first name field in Jones' master profile, such that Alexander may be the only first name displayed by the general overview page of the master profile. The customer resolution engine also assigns a low priority for displaying Al at the bottom of the first name field in Jones' master profile, such that Al may be displayed only by the details page of the master profile. Assigning the high priority for displaying Alexander and the low priority for displaying Al may result in displaying Alexander at the top of the first name field in Jones' master profile and displaying Al at the bottom of the first name field in Jones' master profile. The customer resolution engine assigns the high priority to Alexander and the low priority to Al because the combined first name score of negative 1.66 for Alexander is higher than the combined first name score of negative 1.68 for Al. By learning the data steward's preference for 9 character-length first names with 4 vowels and 5 consonants, and slightly modifying the first name length weight, the first name vowels-consonants weight, and the first name frequencies used by the first name length function and the first name vowels-consonants function, the machine learning framework enables the customer resolution engine to assign a priority for displaying Alexander instead of Al at the top of the first name field in Jones' master profile.

In addition to assigning values' display priorities based on a score for any number of features of each record field value, the customer resolution engine can assign values' display priorities based on a score for any number of features of a composite record field's values. A score is determined based on applying a function to a feature of a value in a field in a record and optionally by applying another function to another feature of another value in another field in the same record. The customer resolution engine can calculate a score for a record's composite field values. For example, a customer resolution engine accesses a retail record that stores Liz Smith, 1 Market Street, San Francisco, 94105, California, USA, applies a city frequency function to the city field's value San Francisco to calculate a city frequency score of 1.0 for San Francisco, applies an abbreviated state name function to the state field's value California to calculate an abbreviated state name score of 0.0 for California, and applies a country name acronym function to the country field's value USA to calculate a country name acronym score of 1.0 for USA. This example describes default preferences for abbreviated state names and country acronyms because the use of shorter descriptions enables the general overview page of each master profile to display a greater number of data fields. Although this example describes the customer resolution engine applying a single function to a single feature of each value in a record's composite fields for the purpose of simplifying the example, the customer resolution engine may apply multiple functions to multiple features of each value in a record's composite fields.

Then the customer resolution engine adds the city frequency score of 1.0 for San Francisco, the abbreviated state name score of 0.0 for California, and the country name acronym score of 1.0 for USA to result in the composite city-state-country score of 2.0 for San Francisco, Calif., USA. Although this example describes the customer resolution engine combining the scores for a record's composite fields without weighing each score differently, the customer resolution engine may assign different weights to each score for a record's composite fields before combining the weighted scores. A function may be based on a general preference associated with a specific feature. A general preference can be a prevalent liking for one alternative over another alternative or other alternatives. A specific feature can be a particular distinctive attribute or aspect of something.

After calculating a score, another score is determined based on applying the first function to the first feature of a first value in the first field in a first record and optionally by applying the second function to the second feature of a second value in the second field in the second record. The customer resolution engine can calculate a score for another record's composite field values. For example, the customer resolution engine accesses a customer service record that stores Elizabeth Smith, 1 Market Street, San Francisco, 94105, CA, USA, applies the city frequency function to the city field's value San Francisco to calculate a city frequency score of 1.0 for San Francisco, applies the abbreviated state name function to the state field's value CA to calculate an abbreviated state score of 1.0 for CA, and applies the country name acronym function to the country field's value USA to calculate a country name acronym score of 1.0 for USA. Then the customer resolution engine adds the city frequency score of 1.0 for San Francisco, the abbreviated state name score of 1.0 for CA, and the country name acronym score of 1.0 for USA to result in the composite city-state-country score of 3.0 for San Francisco, Calif., USA.

Having calculated two scores, a first priority is determined, based on the first score, for displaying a first value in the first field in a profile and optionally displaying a second value in the second field in the profile, and a second priority is determined, based on the second score, for displaying a third value in the first field in the profile and optionally displaying a fourth value in the second field in the profile. The customer resolution engine determines the display priorities for a profile's composite field values. For example, the customer resolution engine assigns a high priority for displaying San Francisco, Calif., USA at the top of the composite city-state-country fields in Smith's master profile, such that San Francisco, Calif., USA may be the only composite city-state-country fields displayed by the general overview page of the master profile. The customer resolution engine also assigns a low priority for displaying San Francisco, Calif., USA at the bottom of the composite city-state-country fields in Smith's master profile, such that San Francisco, Calif., USA may be displayed only by the details page of the master profile. The customer resolution engine assigns a high priority to San Francisco, Calif., USA and a low priority to San Francisco, Calif., USA because the composite city-state-country score of 3.0 for San Francisco, Calif., USA is higher than the composite city-state-country score of 2.0 for San Francisco, Calif., USA.

After calculating the display priorities for the profile field values, at least one parameter associated with a function is revised based on feedback associated with the values. The machine learning framework learns record merging preferences from the data steward's feedback. For example, and without limitation, this can include the machine learning framework receiving the data steward's composite city-state-country preference for San Francisco, Calif., USA over San Francisco, Calif., USA, which is automatically generated in the form of city-state-country fields; San Francisco, Calif., USA; San Francisco, Calif., USA; 0, when the data steward modifies the display order of the composite city-state-country fields San Francisco, Calif., USA and San Francisco, Calif., USA in Smith's master profile. The data steward may have made the modification due to concerns that some of the customer service representatives who lived most of their lives outside the United States may not be completely familiar with all of the abbreviations used for states' names. Since the city field's values and the country field's values are identical for both records, the machine learning framework identifies the state field's values as the only difference between the composite city-state-country fields. Therefore, the machine learning framework changes the preference indicator for state name abbreviations from 1 to 0, which automatically modifies the abbreviated state name function to become a full state name function, which reflects the data steward's preference for full state names and the data steward's lack of preference for abbreviated state names.

Following the revision of the parameter(s), a score is determined based on applying the first function, associated with the revised parameter(s), to the first feature of a first value in the first field in a record, and optionally by applying the second function, associated with the revised parameter(s), to the second feature of a second value in the second field in the record. The customer resolution engine uses the revised parameter(s) to calculate features' scores for another record's composite field values. For example, the customer resolution engine accesses a retail record that stores Al Jones, 1 Wall Street, New York City, N.Y., 10005, United States, and applies a city frequency function to the city field's value New York City to calculate a city frequency score of 1.0 for New York City, applies the new full state name function to the state field's value New York to calculate a full state name score of 1.0 for New York, and applies the country name acronym function to the country field's value United States to calculate a country name acronym score of 0.0 for United States. Then the customer resolution engine adds the city frequency score of 1.0 for New York City, the full state name score of 1.0 for New York, and the country name acronym score of 0.0 for United States to result in the composite city-state-country score of 2.0 for New York City, N.Y., United States.

Having calculated a score, another score is determined based on applying the first function, associated with the revised parameter(s), to the first feature of a first value in the first field in another record, and optionally by applying the second function, associated with the revised parameter(s), to the second feature of a second value in the second field in the other record. The customer resolution engine uses the revised parameter(s) to calculate features' scores for yet another record's composite field values. For example, the customer resolution engine accesses a customer service record that stores Alexander Jones, 1 Wall St, NYC, N.Y., 10005, USA, and applies the city frequency function to the city field's value NYC to calculate a city frequency score of 0.5 for NYC, applies the full state name function to the state field's value NY to calculate a full state name score of 0.0 for NY, and applies the country name acronym function to the country field's value USA to calculate a country name acronym score of 1.0 for USA. Then the customer resolution engine adds the city frequency score of 0.5 for NYC, the full state name score of 0.0 for NY, and the country name acronym score of 1.0 for USA to result in the composite city-state-country score of 1.5 for NYC, N.Y., USA.

After two scores are calculated, a first priority is determined, based on the first score, for displaying a first value in the first field in a profile and optionally for displaying a second value in the second field in the profile, and a second priority is determined, based on the second score, for displaying a third value in the first field in the profile, and optionally for displaying a fourth value in the second field in the profile. The customer resolution engine uses the revised parameter(s) to determine the display priorities for profile's composite field values. For example, the customer resolution engine assigns a high priority for displaying New York City, N.Y., United States at the top of the composite city-state-country fields in Jones' master profile, such that New York City, N.Y., United States may be the only composite city-state-country fields displayed by the general overview page of the master profile. The customer resolution engine also assigns a low priority for displaying NYC, N.Y., USA at the bottom of the composite city-state-country fields in Jones' master profile, such that NYC, N.Y., USA, may be displayed only by the details page of the master profile. The customer resolution engine assigns a high priority to New York City, N.Y., United States and a low priority to NYC, N.Y., USA because the composite city-state-country score of 2.0 for New York City, N.Y., United States is higher than the composite city-state-country score of 1.5 for NYC, N.Y., USA. By learning the data steward's preference for full state names, and modifying the abbreviated state name function to become the full state name function, the machine learning framework enables the customer resolution engine to assign a priority for displaying New York City, N.Y., United States instead of NYC, N.Y., USA at the top of the composite city-state-country fields in Jones' master profile.

System Overview

Figure 4:
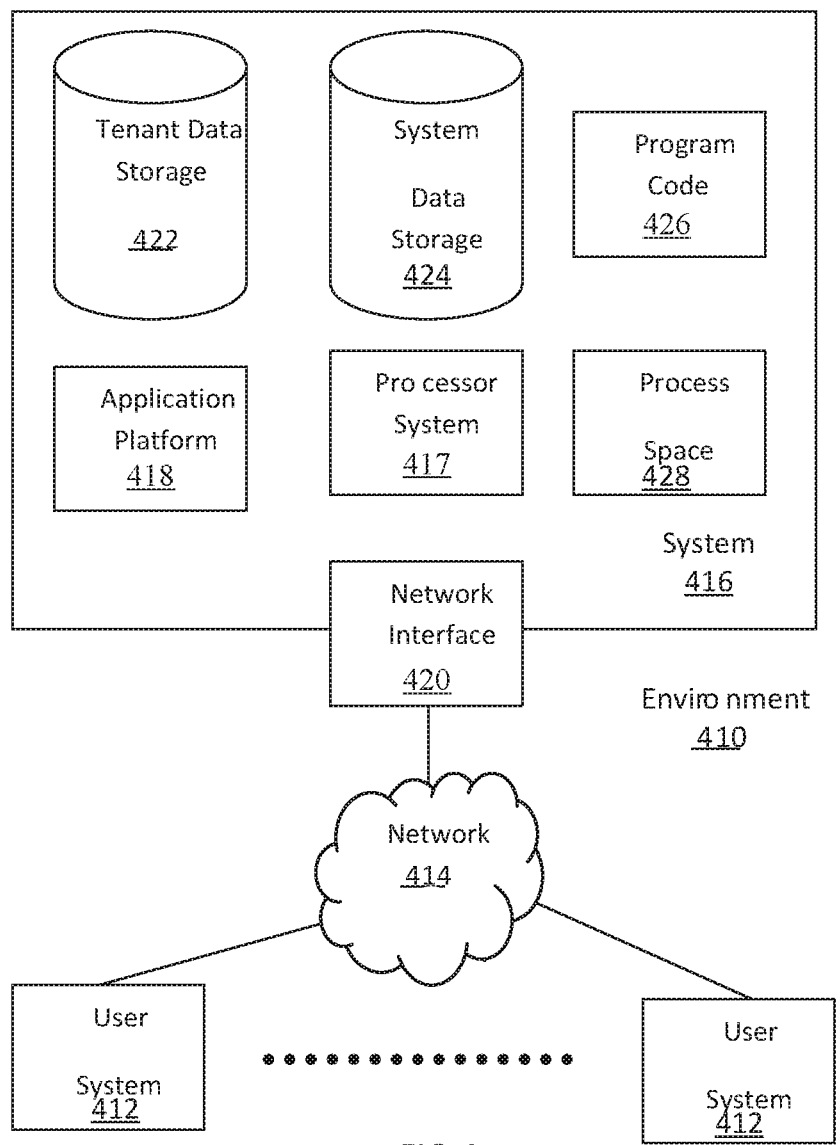
FIG. 4 illustrates a block diagram of an example of an environment wherein an on-demand database service might be used.

FIG. 4 illustrates a block diagram of an environment 410 wherein an on-demand database service might be used. The environment 410 may include user systems 412, a network 414, a system 416, a processor system 417, an application platform 418, a network interface 420, a tenant data storage 422, a system data storage 424, program code 426, and a process space 428. In other embodiments, the environment 410 may not have all of the components listed and/or may have other elements instead of, or in addition to, those listed above.

The environment 410 is an environment in which an on-demand database service exists. A user system 412 may be any machine or system that is used by a user to access a database user system. For example, any of the user systems 412 may be a handheld computing device, a mobile phone, a laptop computer, a work station, and/or a network of computing devices. As illustrated in FIG. 4 (and in more detail in FIG. 5) the user systems 412 might interact via the network 414 with an on-demand database service, which is the system 416.

An on-demand database service, such as the system 416, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, the "on-demand database service 416" and the "system 416" will be used interchangeably herein. A database image may include one or more database objects. A relational database management system (RDMS) or the equivalent may execute storage and retrieval of information against the database object(s). The application platform 418 may be a framework that allows the applications of the system 416 to run, such as the hardware and/or software, e.g., the operating system. In an embodiment, the on-demand database service 416 may include the application platform 418 which enables creation, managing and executing one or more applications developed by the provider of the on-demand database service, users accessing the on-demand database service via user systems 412, or third-party application developers accessing the on-demand database service via the user systems 412.

The users of the user systems 412 may differ in their respective capacities, and the capacity of a particular user system 412 might be entirely determined by permissions (permission levels) for the current user. For example, where a salesperson is using a particular user system 412 to interact with the system 416, that user system 412 has the capacities allotted to that salesperson. However, while an administrator is using that user system 412 to interact with the system 416, that user system 412 has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

The network 414 is any network or combination of networks of devices that communicate with one another. For example, the network 414 may be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

The user systems 412 might communicate with the system 416 using TCP/IP and, at a higher network level, use other common Internet protocols to communicate, such as HTTP, FTP, AFS, WAP, etc. In an example where HTTP is used, the user systems 412 might include an HTTP client commonly referred to as a "browser" for sending and receiving HTTP messages to and from an HTTP server at the system 416. Such an HTTP server might be implemented as the sole network interface between the system 416 and the network 414, but other techniques might be used as well or instead. In some implementations, the interface between the system 416 and the network 414 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, the system 416, shown in FIG. 4, implements a web-based customer relationship management (CRM) system. For example, in one embodiment, the system 416 includes application servers configured to implement and execute CRM software applications as well as provide related data, code, forms, webpages and other information to and from the user systems 412 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, the system 416 implements applications other than, or in addition to, a CRM application. For example, the system 416 may provide tenant access to multiple hosted (standard and custom) applications, including a CRM application. User (or third-party developer) applications, which may or may not include CRM, may be supported by the application platform 418, which manages creation, storage of the applications into one or more database objects and executing of the applications in a virtual machine in the process space of the system 416.

One arrangement for elements of the system 416 is shown in FIG. 4, including the network interface 420, the application platform 418, the tenant data storage 422 for tenant data 423, the system data storage 424 for system data 425 accessible to the system 416 and possibly multiple tenants, the program code 426 for implementing various functions of the system 416, and the process space 428 for executing MTS system processes and tenant-specific processes, such as running applications as part of an application hosting service. Additional processes that may execute on the system 416 include database indexing processes.

Several elements in the system shown in FIG. 4 include conventional, well-known elements that are explained only briefly here. For example, each of the user systems 412 could include a desktop personal computer, workstation, laptop, PDA, cell phone, or any wireless access protocol (WAP) enabled device or any other computing device capable of interfacing directly or indirectly to the Internet or other network connection. Each of the user systems 412 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of the user systems 412 to access, process and view information, pages and applications available to it from the system 416 over the network 414. Each of the user systems 412 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by the system 416 or other systems or servers. For example, the user interface device may be used to access data and applications hosted by the system 416, and to perform searches on stored data, and otherwise allow a user to interact with various GUI pages that may be presented to a user. As discussed above, embodiments are suitable for use with the Internet, which refers to a specific global internetwork of networks. However, it should be understood that other networks may be used instead of the Internet, such as an intranet, an extranet, a virtual private network (VPN), a non-TCP/IP based network, any LAN or WAN or the like.

According to one embodiment, each of the user systems 412 and all of its components are operator configurable using applications, such as a browser, including computer code run using a central processing unit such as an Intel Pentium® processor or the like. Similarly, the system 416 (and additional instances of an MTS, where more than one is present) and all of their components might be operator configurable using application(s) including computer code to run using a central processing unit such as the processor system 417, which may include an Intel Pentium® processor or the like, and/or multiple processor units. A computer program product embodiment includes a machine-readable storage medium (media) having instructions stored thereon/in which may be used to program a computer to perform any of the processes of the embodiments described herein. Computer code for operating and configuring the system 416 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), micro-drive, and magneto-optical disks, and magnetic or optical cards, Nano-systems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments may be implemented in any programming language that may be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, the system 416 is configured to provide webpages, forms, applications, data and media content to the user (client) systems 412 to support the access by the user systems 412 as tenants of the system 416. As such, the system 416 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein may be implemented as single databases, a distributed database, a collection of distributed databases, a database with redundant online or offline backups or other redundancies, etc., and might include a distributed database or storage network and associated processing intelligence.

Figure 5:
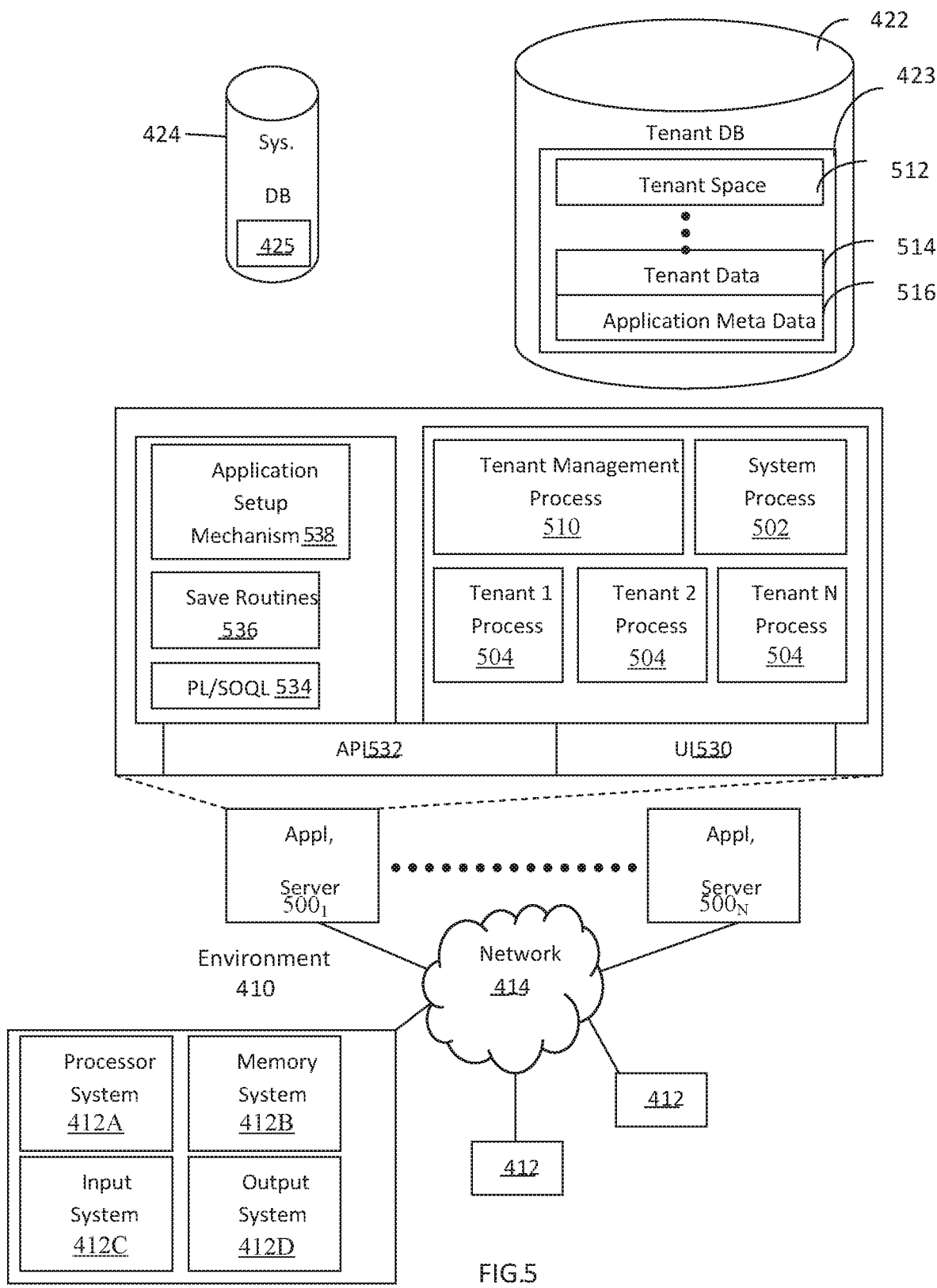
FIG. 5 illustrates a block diagram of an embodiment of elements of FIG. 4 and various possible interconnections between these elements.

FIG. 5 also illustrates the environment 410. However, in FIG. 5 elements of the system 416 and various interconnections in an embodiment are further illustrated. FIG. 5 shows that the each of the user systems 412 may include a processor system 412A, a memory system 412B, an input system 412C, and an output system 412D. FIG. 5 shows the network 414 and the system 416. FIG. 5 also shows that the system 416 may include the tenant data storage 422, the tenant data 423, the system data storage 424, the system data 425, a User Interface (UI) 530, an Application Program Interface (API) 532, a PL/SOQL 534, save routines 536, an application setup mechanism 538, applications servers 500$_1$-500$_N$, a system process space 502, tenant process spaces 504, a tenant management process space 510, a tenant storage area 512, a user storage 514, and application metadata 516. In other embodiments, the environment 410 may not have the same elements as those listed above and/or may have other elements instead of, or in addition to, those listed above.

The user systems 412, the network 414, the system 416, the tenant data storage 422, and the system data storage 424 were discussed above in FIG. 4. Regarding the user systems 412, the processor system 412A may be any combination of one or more processors. The memory system 412B may be any combination of one or more memory devices, short term, and/or long-term memory. The input system 412C may be any combination of input devices, such as one or more keyboards, mice, trackballs, scanners, cameras, and/or interfaces to networks. The output system 412D may be any combination of output devices, such as one or more monitors, printers, and/or interfaces to networks. As shown by FIG. 5, the system 416 may include the network interface 420 (of FIG. 4) implemented as a set of HTTP application servers 500, the application platform 418, the tenant data storage 422, and the system data storage 424. Also shown is the system process space 502, including individual tenant process spaces 504 and the tenant management process space 510. Each application server 500 may be configured to access tenant data storage 422 and the tenant data 423 therein, and the system data storage 424 and the system data 425 therein to serve requests of the user systems 412. The tenant data 423 might be divided into individual tenant storage areas 512, which may be either a physical arrangement and/or a logical arrangement of data. Within each tenant storage area 512, the user storage 514 and the application metadata 516 might be similarly allocated for each user. For example, a copy of a user's most recently used (MRU) items might be stored to the user storage 514. Similarly, a copy of MRU items for an entire organization that is a tenant might be stored to the tenant storage area 512. The UI 530 provides a user interface and the API 532 provides an application programmer interface to the system 416 resident processes to users and/or developers at the user systems 412. The tenant data and the system data may be stored in various databases, such as one or more Oracle™ databases.

The application platform 418 includes the application setup mechanism 538 that supports application developers' creation and management of applications, which may be saved as metadata into the tenant data storage 422 by the save routines 536 for execution by subscribers as one or more tenant process spaces 504 managed by the tenant management process 510 for example. Invocations to such applications may be coded using the PL/SOQL 534 that provides a programming language style interface extension to the API 532. A detailed description of some PL/SOQL language embodiments is discussed in commonly owned U.S. Pat. No. 7,730,478 entitled, METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007, which is incorporated in its entirety herein for all purposes. Invocations to applications may be detected by one or more system processes, which manages retrieving the application metadata 516 for the subscriber making the invocation and executing the metadata as an application in a virtual machine.

Each application server 500 may be communicably coupled to database systems, e.g., having access to the system data 425 and the tenant data 423, via a different network connection. For example, one application server $500_1$ might be coupled via the network 414 (e.g., the Internet), another application server $500_{N-1}$ might be coupled via a direct network link, and another application server $500_N$ might be coupled by yet a different network connection. Transfer Control Protocol and Internet Protocol (TCP/IP) are typical protocols for communicating between application servers 500 and the database system. However, it will be apparent to one skilled in the art that other transport protocols may be used to optimize the system depending on the network interconnect used.

In certain embodiments, each application server 500 is configured to handle requests for any user associated with any organization that is a tenant. Because it is desirable to be able to add and remove application servers from the server pool at any time for any reason, there is preferably no server affinity for a user and/or organization to a specific application server 500. In one embodiment, therefore, an interface system implementing a load balancing function (e.g., an F5 Big-IP load balancer) is communicably coupled between the application servers 500 and the user systems 412 to distribute requests to the application servers 500. In one embodiment, the load balancer uses a least connections algorithm to route user requests to the application servers 500. Other examples of load balancing algorithms, such as round robin and observed response time, also may be used. For example, in certain embodiments, three consecutive requests from the same user could hit three different application servers 500, and three requests from different users could hit the same application server 500. In this manner, the system 416 is multi-tenant, wherein the system 416 handles storage of, and access to, different objects, data and applications across disparate users and organizations.

As an example of storage, one tenant might be a company that employs a sales force where each salesperson uses the system 416 to manage their sales process. Thus, a user might maintain contact data, leads data, customer follow-up data, performance data, goals and progress data, etc., all applicable to that user's personal sales process (e.g., in the tenant data storage 422). In an example of a MTS arrangement, since all of the data and the applications to access, view, modify, report, transmit, calculate, etc., may be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by the system 416 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, the system 416 might also maintain system level data usable by multiple tenants or other data. Such system level data might include industry reports, news, postings, and the like that are sharable among tenants.

In certain embodiments, the user systems 412 (which may be client systems) communicate with the application servers 500 to request and update system-level and tenant-level data from the system 416 that may require sending one or more queries to the tenant data storage 422 and/or the system data storage 424. The system 416 (e.g., an application server 500 in the system 416) automatically generates one or more SQL statements (e.g., one or more SQL queries) that are designed to access the desired information. The system data storage 424 may generate query plans to access the requested data from the database.

Each database can generally be viewed as a collection of objects, such as a set of logical tables, containing data fitted into predefined categories. A "table" is one representation of a data object, and a table may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. Pat. No. 7,779,039, filed Apr. 2, 2004, entitled "Custom Entities and Fields in a Multi-Tenant Database System", which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A system comprising:
one or more processors; and
a non-transitory computer readable medium storing a plurality of instructions, which when executed, cause the one or more processors to:
determine a first score based on applying a function to a feature of a first value in a field in a first record;
determine a second score based on applying the function to the feature of a second value in the field in a second record;
determine a first priority, based on the first score, for displaying the first value in the field in a first profile, and a second priority, based on the second score, for displaying the second value in the field in the first profile, the first profile including a first merged record comprising data values of the first record and data values of the second record;
revise, by a trained machine-learning framework which uses feedback associated with the first value and the second value displayed in the first profile, at least one parameter associated with the function, the revised parameter being a changed numerical factor establishing the conditions of operation of the function in the system;
determine a third score based on applying the function, associated with the revised at least one parameter revised by the trained machine-learning framework, to the feature of a third value in the field in a third record;
determine a fourth score based on applying the function, associated with the revised at least one parameter revised by the trained machine-learning framework, to the feature of a fourth value in the field in a fourth record;
determine a third priority, based on the third score, for displaying the third value in the field in a second profile, and a fourth priority, based on the fourth score, for displaying the fourth value in the field in the second profile, the second profile including a second merged record comprising data values of the third record and data values of the fourth record, and
display, using corresponding priorities determined by the function revised by the trained machine-learning framework, the third value towards a top of the field in the second profile and the fourth value towards a bottom of the field in the second profile.

2. The system of claim 1, wherein determining the first score is further based on applying another function to another feature of the first value in the field in the first record, determining the second score is further based on applying the other function to the other feature of the second value in the field in the second record, determining the third score is further based on applying the other function, associated with the revised at least one parameter, to the other feature of the third value in the field in the third record, and determining the fourth score is further based on applying the other function, associated with the revised at least one parameter, to the other feature of the fourth value in the field in a fourth record.

3. The system of claim 1, wherein determining the first score is further based on applying a second function to a second feature of a fifth value in a second field in the first record, determining the second score is further based on applying the second function to the second feature of a sixth value in the second field in the second record, the first priority is also for displaying the fifth value in the second field in the first profile, the second priority is also for displaying the sixth value in the second field in the first profile, the at least one parameter is also associated with the second function, and the feedback is also associated with the fifth value and the sixth value.

4. The system of claim 3, wherein determining the third score is further based on applying the second function, associated with the revised at least one parameter, to the second feature of a seventh value in the second field in the third record, determining the fourth score is further based on applying the second function, associated with the revised at least one parameter, to the second feature of an eighth value in the second field in the fourth record, the third priority is also for displaying the seventh value in the second field in the second profile, and the fourth priority is also for displaying the eighth value in the second field in the second profile.

5. The system of claim 1, wherein the feedback is received from a data steward and comprises the first value, the second value, and a preference for one of the first value and the second value.

6. The system of claim 1, wherein the function is based on a frequency of a specific value occurring in a set of values.

7. The system of claim 1, wherein the function is based on a general preference associated with a specific feature.

8. A computer program product comprising computer-readable program code to be executed by one or more processors when retrieved from a non-transitory computer-readable medium, the program code including instructions to:
determine a first score based on applying a function to a feature of a first value in a field in a first record;
determine a second score based on applying the function to the feature of a second value in the field in a second record;
determine a first priority, based on the first score, for displaying the first value in the field in a first profile, and a second priority, based on the second score, for displaying the second value in the field in the first profile, the first profile including a first merged record comprising data values of the first record and data values of the second record;
revise, by a trained machine-learning framework which uses feedback associated with the first value and the second value displayed in the first profile, at least one parameter associated with the function, the revised parameter being a changed numerical factor establishing the conditions of operation of the function;
determine a third score based on applying the function, associated with the revised at least one parameter revised by the trained machine-learning framework, to the feature of a third value in the field in a third record;
determine a fourth score based on applying the function, associated with the revised at least one parameter revised by the trained machine-learning framework, to the feature of a fourth value in the field in a fourth record;
determine a third priority, based on the third score, for displaying the third value in the field in a second profile, and a fourth priority, based on the fourth score, for displaying the fourth value in the field in the second profile, the second profile including a second merged record comprising data values of the third record and data values of the fourth record, and
display, using corresponding priorities determined by the function revised by the trained machine-learning framework, the third value towards a top of the field in the second profile and the fourth value towards a bottom of the field in the second profile.

9. The computer program product of claim 8, wherein determining the first score is further based on applying another function to another feature of the first value in the field in the first record, determining the second score is further based on applying the other function to the other feature of the second value in the field in the second record, determining the third score is further based on applying the other function, associated with the revised at least one parameter, to the other feature of the third value in the field in the third record, and determining at least one parameter, to the other feature of the fourth value in the field in a fourth record.

10. The computer program product of claim 8, wherein determining the first score is further based on applying a second function to a second feature of a fifth value in a second field in the first record, determining the second score is further based on applying the second function to the second feature of a sixth value in the second field in the second record, the first priority is also for displaying the fifth value in the second field in the first profile, the second priority is also for displaying the sixth value in the second field in the first profile, the at least one parameter is also associated with the second function, and the feedback is also associated with the fifth value and the sixth value.

11. The computer program product of claim 10, wherein determining the third score is further based on applying the second function, associated with the revised at least one parameter, to the second feature of a seventh value in the second field in the third record, determining the fourth score is further based on applying the second function, associated with the revised at least one parameter, to the second feature of an eighth value in the second field in the fourth record, the third priority is also for displaying the seventh value in the second field in the second profile, and the fourth priority is also for displaying the eighth value in the second field in the second profile.

12. The computer program product of claim 8, wherein the feedback is received from a data steward and comprises the first value, the second value, and a preference for one of the first value and the second value.

13. The computer program product of claim 8, wherein the function is based on a frequency of a specific value occurring in a set of values.

14. The computer program product of claim 8, wherein the function is based on a general preference associated with a specific feature.

15. A method comprising:
determining a first score based on applying a function to a feature of a first value in a field in a first record;
determining a second score based on applying the function to the feature of a second value in the field in a second record;
determining a first priority, based on the first score, for displaying the first value in the field in a first profile, and a second priority, based on the second score, for displaying the second value in the field in the first profile, the first profile including a first merged record comprising data values of the first record and data values of the second record;
revising, by a trained machine-learning framework which uses feedback associated with the first value and the second value displayed in the first profile, at least one parameter associated with the function, the revised parameter being a changed numerical factor establishing the conditions of operation of the function;
determining a third score based on applying the function, associated with the revised at least one parameter revised by the trained machine-learning framework, to the feature of a third value in the field in a third record;
determining a fourth score based on applying the function, associated with the revised at least one parameter revised by the trained machine-learning framework, to the feature of a fourth value in the field in a fourth record;

determining a third priority, based on the third score, for displaying the third value in the field in a second profile, and a fourth priority, based on the fourth score, for displaying the fourth value in the field in the second profile, the second profile including a second merged record comprising data values of the third record and data values of the fourth record, and displaying, using corresponding priorities determined by the function revised by the trained machine-learning framework, the third value towards a top of the field in the second profile and the fourth value towards a bottom of the field in the second profile.

16. The method of claim 15, wherein determining the first score is further based on applying another function to another feature of the first value in the field in the first record, determining the second score is further based on applying the other function to the other feature of the second value in the field in the second record, determining the third score is further based on applying the other function, associated with the revised at least one parameter, to the other feature of the third value in the field in the third record, and determining the fourth score is further based on applying the other function, associated with the revised at least one parameter, to the other feature of the fourth value in the field in a fourth record.

17. The method of claim 15, wherein determining the first score is further based on applying a second function to a second feature of a fifth value in a second field in the first record, determining the second score is further based on applying the second function to the second feature of a sixth value in the second field in the second record, the first priority is also for displaying the fifth value in the second field in the first profile, the second priority is also for displaying the sixth value in the second field in the first profile, the at least one parameter is also associated with the second function, and the feedback is also associated with the fifth value and the sixth value.

18. The method of claim 17, wherein determining the third score is further based on applying the second function, associated with the revised at least one parameter, to the second feature of a seventh value in the second field in the third record, determining the fourth score is further based on applying the second function, associated with the revised at least one parameter, to the second feature of an eighth value in the second field in the fourth record, the third priority is also for displaying the seventh value in the second field in the second profile, and the fourth priority is also for displaying the eighth value in the second field in the second profile.

19. The method of claim 15, wherein the feedback is received from a data steward and comprises the first value, the second value, and a preference for one of the first value and the second value.

20. The method of claim 15, wherein the function is based on one of a frequency of a specific value occurring in a set of values, and a general preference associated with a specific feature.

* * * * *